United States Patent
Nolan et al.

(10) Patent No.: US 9,909,039 B2
(45) Date of Patent: Mar. 6, 2018

(54) BONDING COMPOSITIONS

(71) Applicant: Henkel IP & Holding GmbH, Duesseldorf (DE)

(72) Inventors: Darren Nolan, Dublin (IE); Eimear Fleming, Dublin (IE); Deirdre Ledwith, Dublin (IE); Brendan Kneafsey, Dublin (IE); John Walsh, Thurles (IE); Eimear Finnigan, Skerries (IE)

(73) Assignee: Henkel IP Holding GmbH, Duesseldorf (DE)

( * ) Notice: Subject to any disclaimer, the term of this patent is extended or adjusted under 35 U.S.C. 154(b) by 0 days.

(21) Appl. No.: 14/657,299

(22) Filed: Mar. 13, 2015

(65) Prior Publication Data
US 2016/0347974 A1 Dec. 1, 2016

Related U.S. Application Data

(63) Continuation of application No. PCT/EP2012/068148, filed on Sep. 14, 2012.

(51) Int. Cl.

| | |
|---|---|
| *C09J 129/14* | (2006.01) |
| *C09J 163/00* | (2006.01) |
| *C09J 123/28* | (2006.01) |
| *C09J 101/14* | (2006.01) |
| *B32B 37/12* | (2006.01) |
| *C08L 23/28* | (2006.01) |
| *C08L 61/06* | (2006.01) |
| *C08L 61/28* | (2006.01) |

(52) U.S. Cl.
CPC ............ *C09J 129/14* (2013.01); *B32B 37/12* (2013.01); *C08L 23/286* (2013.01); *C09J 101/14* (2013.01); *C09J 123/286* (2013.01); *C09J 163/00* (2013.01); *B32B 37/1284* (2013.01); *B32B 2309/02* (2013.01); *B32B 2309/12* (2013.01); *C08L 61/06* (2013.01); *C08L 61/28* (2013.01)

(58) Field of Classification Search
CPC ...... C09J 129/04; C09J 129/14; C09J 163/00; C07F 7/0814; B32B 37/12
See application file for complete search history.

(56) References Cited

U.S. PATENT DOCUMENTS

| | | | |
|---|---|---|---|
| 3,308,008 A | 3/1967 | Ronay | |
| 4,031,120 A * | 6/1977 | Gervase | C08G 18/289 106/287.11 |
| 4,098,749 A | 7/1978 | Hoshino et al. | |
| 5,656,365 A * | 8/1997 | Dages | B32B 17/10036 428/221 |
| 6,902,760 B2 | 6/2005 | Wefringhaus et al. | |
| 8,153,268 B1 * | 4/2012 | Fay | C08G 18/289 156/325 |
| 8,303,762 B2 | 11/2012 | Fay et al. | |
| 8,524,814 B2 * | 9/2013 | Fay | C07F 9/12 106/287.23 |
| 2003/0232917 A1 | 12/2003 | Wefringhaus et al. | |
| 2009/0181248 A1 | 7/2009 | Van Ooij et al. | |
| 2010/0234502 A1 | 9/2010 | Iwasaki et al. | |
| 2012/0003501 A1 | 1/2012 | Fay et al. | |

FOREIGN PATENT DOCUMENTS

| | | |
|---|---|---|
| CA | 1087774 | 10/1980 |
| CN | 101851349 A | 10/2010 |
| EP | 1923443 | 5/2008 |
| GB | 2083011 B | 4/1985 |
| JP | S59161451 A | 9/1984 |
| JP | H08143343 A | 6/1996 |
| JP | H09263960 A | 10/1997 |
| JP | 2001260235 A | 9/2001 |
| JP | 2004515631 A | 5/2004 |
| WO | 2011032998 A1 | 11/1969 |
| WO | 2004078867 | 9/2004 |
| WO | 2009118255 | 10/2009 |
| WO | 2011029752 | 3/2011 |
| WO | 2012146298 | 11/2012 |

OTHER PUBLICATIONS

Kroschwitz (Encyclopedia of Chemical Technology, 4th Ed., vol. 24, 1997, pp. 924-943).*
Encyclopedia of Polymer Science and Technology, Epoxy Resins, vol. 6, 1967, Interscience Publishers, N.Y., pp. 209-271.
ASTM D6556-10, Standard Test Method for Carbon Black—Total and External Surface Area by Nitrogen Adsorption, 2012, 6 pages.
International Search Report issued in connection with International Patent Application No. PCT/EP2012/068148 dated Jul. 23, 2013.

* cited by examiner

*Primary Examiner* — Kuo-Liang Peng
(74) *Attorney, Agent, or Firm* — James E. Piotrowski

(57) ABSTRACT

There is provided a curable composition comprising one or more reactive components that cure upon exposure to suitable conditions, the curable composition comprising:
(i) at least one aromatic nitroso or at least one aromatic nitroso precursor compound or combinations thereof; and
(ii) a film former component comprising at least one non-halogenated hydroxy group-containing resin together with at least one crosslinking agent.

17 Claims, No Drawings

BONDING COMPOSITIONS

BACKGROUND

Field

The present invention provides for improved bonding compositions where the bonding composition includes a film former component. In particular, the present invention provides for improved bonding compositions useful in bonding polymers to substrates such as metals, glass or other hydroxylated substrates and in particular elastomer to substrate bonding compositions. Of particular interest are compositions comprising at least one non-halogenated polymer. The compositions of the invention display good bonding properties under various testing conditions, such as initial and pre-bakes tests. Such properties are of particular interest in vulcanisation processes.

Brief Description of Related Technology

Reinforced composite materials play a critical role in the manufacture of high-performance products that need to be lightweight, yet strong enough to take harsh loading and operating conditions. Popular reinforcing materials included wood, glass, metals, quartz and carbon fibres. Composites reinforced with these types of substrate may find utility in the manufacture of a number of structural materials such as aerospace components and racing car bodies.

Polymer to metal substrate and, in particular rubber, to metal bonding has been practised for many years. There are many applications for formulations which achieve polymer or rubber to metal bonding. Rubber to metal bonding is widely used to bond different metals to a natural or synthetic rubber so as to combine the structural strength of the metal with the elastomeric properties of the rubber.

Accordingly, metal and polymers such as rubber are often bonded to each other for impact absorption applications, such as in bearings, wheels, shock absorbers, moving arms, etc. Such components can be utilised on a very small scale, for example in PC components or on a very large scale for example in constructions such as bridges and buildings. Noise reduction may also be achieved by utilising metal to rubber bonding. It is accepted that tremendous forces can be experienced by any component that comprises metal and rubber bonded together. Thus, it is desirable to provide metal to rubber bonding, which can withstand significant forces, such as compressive or extensive pressures including shocks without having the metal or the rubber separate from each other. There are many other rubber to metal bonding applications, including tyre production where internal wire reinforcements for the tyre are bonded to the rubber of the tyre. Prior art compositions are discussed below.

Glass fibre reinforced composite materials consist of high strength glass fibres embedded in a matrix. For example, Glass Fibre Reinforced Concrete comprises glass fibres embedded in cement-based matrix and may find utility in buildings and other structural edifices. Similarly, Glass Reinforced Plastic comprises glass fibres embedded in a plastic material. Glass Reinforced Plastics are immensely versatile materials which combine to provide lightweight materials with high strength performance. Glass reinforced plastics find utility in a number of different areas from structural engineering to telecommunications.

Elastomer to glass bonding provides an attractive means by which the structural strength of glass can be combined with the elastomeric properties of the elastomer/rubber. Reinforcing fibres such as glass fibres have been used as a reinforcing material for rubber articles such as in rubber belts, tyres and hoses. In particular, glass fibres have been employed to reinforce automotive timing belts, where there is a need for synchronous transfer of power from crankshaft to overhead camshaft without loss of inertia.

Traditionally, such glass cord composites are manufactured by coating individual filaments of glass yarn with specialised coatings, such as resorcinol formaldehyde latex ("RFL") formulations. Conventional rubber to metal bonding products are then employed to bond the RFL latex to the rubber via a vulcanisation step.

Traditional rubber-to-metal bonding technology incorporates a two-step system, where in a first step a primer is applied and thereafter in a second step an improved curable, for example, adhesive composition is applied. The primer ordinarily consists of solutions or suspensions of chlorinated rubber and phenolic resins containing reactive groups, and also pigments such as titanium dioxide, zinc oxide, carbon black, etc. The primer is generally applied as a thin layer onto a treated (cleaned) surface of a metallic component such as treated steel component for example a component that has been grit blasted or chemically treated.

The improved curable composition ordinarily consists of a large range of rubber materials and cross-linkers. These include, but are not restricted to, chlorinated and bromochlorinated rubbers, aromatic nitrosobenzene compounds and bismaleimide as cross-linkers, xylene, perchloroethylene and ethylbenzene as solvents, and also some lead or zinc salts. The improved curable composition layer is generally the link between the primed metal and the rubber. Other cross-linkers that have been employed in rubber-to-metal bonding technology are aromatic nitroso compounds, such as p-dinitrosobenzene.

Many formulations for rubber to metal bonding exist. For example silanes have been used as corrosion inhibitors and as rubber-to-metal bonding adhesion promoters. U.S. Patent Application Publication No. 2009/0181248 discloses substantially hydrolysed silane solutions, for example bis(trimethoxypropyl)amine and bis(triethoxypropyl)tetrasulfide, for use in a rubber to metal bonding composition. The amino silane and sulphide silane are formulated in a ratio of 1:3 respectively, in an ethanol/water solution.

International Patent Publication No. WO2004/078867 to Lord Corporation describes a single coat solvent-based improved curable composition designed to bond thermoplastic elastomers containing an alkoxy silane/urethane adduct and a chlorinated polymer. Methods of synthesis and formulation are described within this patent document. U.S. Pat. No. 4,031,120 to Lord Corporation describes a composition comprising an isocyanate functional organosilane, in combination with a polyisocyanate and an aromatic nitroso compound. The resulting system is described as a one-coat improved curable composition for bonding a variety of elastomeric materials to metals and other substrates.

Canadian Patent No. 1,087,774 describes a composition for use in the production of composite rubber materials. The composition discloses a one-part composition comprising a vulcanisable polymer, a discrete aromatic nitroso compound and a discrete organic phosphonic acids (and partial esters thereof). Problematically, the toxic nitrosobenzene component is freely formulated within the composition.

Generally, it is desirable that bonding is achieved during a vulcanisation step like compression moulding, transfer moulding, injection moulding and autoclave heating, for example with steam or hot air. For example, semi-solid rubber can be injected into a mould. The semi-solid rubber is then cross-linked into a fully cured rubber and the bond with the substrate is formed at the same time.

Certain requirements of the curing system are desirable. These include, ease of processing, stability (for example avoiding sedimentation), ease of application, fast drying (to allow handling without fouling), good wetting properties, and good curing strengths. Curing should be achieved independently of the type of elastomer (rubber) employed and also independently of the type of substrate. It will be appreciated that some rubbers are blended materials and accordingly it is desirable that good curing is achieved with such blended materials. Suitably consistent curing is achieved under various process parameters.

Certain elastomer to substrate adhesive compositions have typically comprised a film former component. Often the film former component includes a halogenated polymer (such as chlorinated isoprene, bromo/chloro butadiene) and a crosslinking agent (such as dinitrosobenzene or nitrososilane). The purpose of the film former is to allow the bonding composition to be applied (by spraying, rolling or dipping from solvent based adhesive composition) to the bonding substrate (usually a metal) as a dry tack free film. The coated part can then be bonded immediately or more usually after a desired period of time which conveniently allows for transportation to different facilities or allows for storage before bonding is carried out. The applied film needs to be robust and withstand typical chipping or scratching which can occur during transport or storage. The film former component should also not full react or cross-link too quickly at the vulcanisation temperature, otherwise poor bonding may occur (as evidenced by short pre-bake resistance, where the films react too quickly giving poor bonding). The film also needs be robust enough to resist being swept from the metal surface (sweep resistance) during for example, a rubber injection vulcanisation process. Therefore, the film must remain solid and have sweep resistance at the vulcanisation temperatures (normally 150-180° C.). The film former must not be so cross-linked or solid at the vulcanisation temperatures as to restrict the mobility or reactivity of nitroso moieties within with the rubber, otherwise poor bonding will result.

Notwithstanding the state of the art it would be desirable to provide improved compositions to bond polymeric substrates to a variety of substrates (such as metals, glass, quartz, etc.) that remedy some or all of the known deficiencies and/or provide alternatives to the existing technologies so that consumers have more possibilities from which to choose.

SUMMARY

The present invention provides improved curiable compositions, such as those forming bonds, and methods of bonding of polymers or polymeric materials to various substrates which may including metal, glass or other hydroxylated surfaces, using the improved composition of the invention. The improved composition of the invention may also be used in bonding in materials in which reactions in which sulfur can participate such as those mentioned above and for example in vulcanisation.

Accordingly, in a first aspect of the invention, there is provided a curable composition comprising one or more reactive components that cure upon exposure to suitable conditions, the curable composition comprising:

(i) at least one aromatic nitroso or at least one aromatic nitroso precursor compound or combinations thereof; and (ii) a film former component comprising at least one non-halogenated hydroxy group-containing resin together with at least one crosslinking agent.

Advantageously, the film former of the invention have tailorable reactivity that can be adjusted to deliver the correct level of robustness, and at the same time, allow excellent bonding to the rubber. The film former of the invention gives better control than the chlorinated olefin film formers (a number of the examples of the present invention herein should show excellent pre-bake resistance i.e. up to 10 minutes).

The term "reactive components that cure upon exposure to suitable conditions" as used herein refers to monomers, oligomers, or polymers made from natural or synthetic, modified or unmodified resins which are not fully cured and/or crosslinked, e.g., which are capable of being further cured and/or crosslinked by exposing said reactive components to suitable conditions, such as heat.

In a preferred embodiment the "reactive components that cure upon exposure to suitable conditions" means crosslinkable polymer components (for example, an elastomeric material, such as uncured rubber), that cure on exposure to heat, whereby application of heat results in increased crosslinking, which has the effect of increasing the molecular weight of the polymer. Preferably, these components crosslink at temperatures greater than about 50° C.

Said reactive components can be used in combination with additive components which facilitate the curing or crosslinking reaction of said reactive components. Examples of additive components include alkoxy silanes and aromatic nitroso compounds or precursor compounds (examples of these components and compositions are disclosed in International publication WO 2011/029752, the contents of which are incorporated herein by reference). Such nitroso structures are recognised in the art to assist in the formation of desirable bonds to polymeric substrates, such as elastomeric substrates. Suitable nitrososilanes are also disclosed above herein and in U.S. patent application Ser. No. 12/055, 908, the disclosure of which is hereby incorporated herein by reference. Cure conditions for these compounds are described herein.

It is also to be appreciated that oligomers are also encompassed by this definition.

Desirably, the non-halogenated hydroxyl group-containing resin has the general structure:

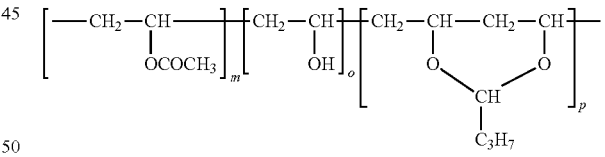

wherein each of n, o and p is at least 5, and the combined % wt of the m, o and p components in the non-halogenated hydroxyl group-containing resin is 100%.

Suitably, a preferred polycellulose acetate butyrate polymer has the general structure:

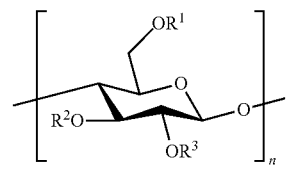

wherein $R^1$, $R^2$, $R^3$ are independently selected from acetyl, butyryl or H, and n is an integer great than 10.

The non-halogenated hydroxy group-containing resin may be present in the composition of the invention in a range of from about 0.5 to 10% wt/wt of the total weight of the curable composition. Suitably, the non-halogenated hydroxy group-containing resin may be present in the composition of the invention in a range of from about 1 to 3% wt/wt of the total weight of the curable composition, as this range gives particular good film properties.

Suitably, the non-halogenated hydroxy group-containing resin may have a hydroxy content of from about 5 to 35% wt/wt of the total weight of the non-halogenated hydroxy group-containing resin. More suitably, the non-halogenated hydroxy group-containing resin may have a hydroxy content of from about 7 to 30% wt/wt of the total weight of the non-halogenated hydroxy group-containing resin, to provide optimum crosslinking.

In the compositions of the invention, the at least one crosslinking agent may be a compound having at least two reactive moieties, each of which can undergo a crosslinking reaction with a hydroxy group of the at least one non-halogenated hydroxy group-containing resin.

By the term "crosslinking", it is meant that the crosslinking agent reacts with the non-halogenated hydroxy group-containing resin resulting in a cross-linked molecule with an molecular weight greater than that of the non-halogenated hydroxy group-containing resin starting component.

The crosslinking agent may be selected from the group consisting of: epoxy resins, phenolic resins, melamines, isocyanates, anhydrides, aldehydes, each of which resins having at least two reactive moieties, and mixtures thereof. Examples of such crosslinking agents are shown below.

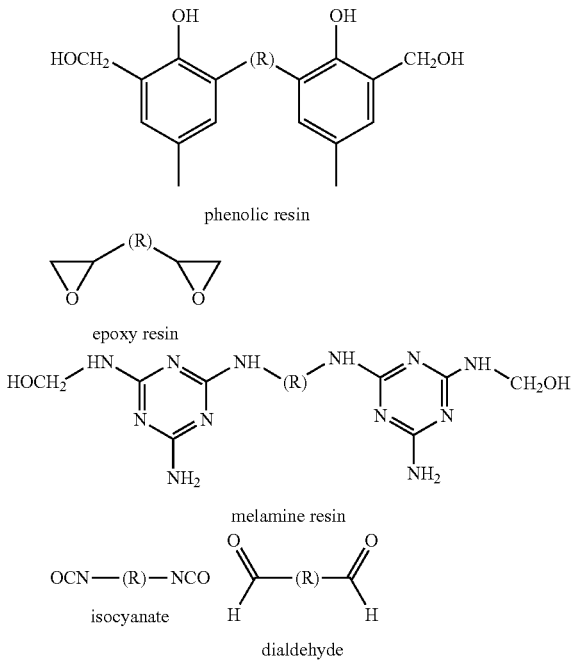

wherein R are a linking group which may be made of single moieties or repeating units or intermediate chains onto which the functional groups are located at opposing terminating ends. The skilled person will appreciate that such chains R may contain repeating aliphatic or aromatic groups, or combinations thereof, and that these groups can be substituted or unsubstituted with further groups, for example, branched or unbranched alkyl groups having from 1 to 6 carbons.

Preferred crosslinking agents comprising functional groups which form chemical bonds with the OH groups of the non-halogenated hydroxyl-containing resin. Examples of such crosslinking agents are phenol formaldehyde resins, polyfunctional aldehydes, polyfunctional epoxides, melamine resins (such as melamine formaldehyde resins) and polyfunctional isocyanates.

Suitable epoxy resins may vary in chemical identity. Preferred epoxy resins may be selected from (a) epoxy resins comprised mainly of the monomeric diglycidyl ether of bisphenol-A; (b) epoxy resins comprised mainly of the monomeric diglycidyl ether of bisphenol-F; (c) epoxy resins comprised mainly of the hydrogenated diglycidyl ether of bisphenol-A; (d) polyepoxidized phenol novolacs; (e) diepoxides of polyglycols, alternatively known as an epoxy terminated polyether; or (f) a mixture of any of the foregoing epoxy resins of (a) through (e). To save unnecessarily detailed description, further information on these classes is in the Encyclopedia of Polymer Science and Technology, Volume 6, 1967, Interscience Publishers, N.Y., pages 209-271, which is incorporated herein by reference.

Particularly preferred crosslinking agents are selected from epoxy resins having at least two oxirane ring systems and/or phenolic resins. Desirably, the crosslinking agent is a phenolic resin. Phenolic resins are well known in the art.

It will be understood that depending on the nature of the compound having at least two reactive moieties, the crosslinking reaction may be for example a condensation reaction with a hydroxy group of the linear non-halogenated hydroxy groups containing resin (eliminating water or other small molecule). In the case where the at least one crosslinking agent is an epoxide with at least two epoxide groups, such as a diepoxide, each epoxide group can undergo a nucleophilic substitution or epoxide ring opening reaction with the hydroxy group of the linear non-halogenated hydroxy groups containing resin.

Preferably, the curable composition of the invention may comprise at least one aromatic nitroso or at least one aromatic nitroso precursor compound which may comprises at least one alkoxy silane moiety and at least one moiety selected from an aromatic nitroso or an aromatic nitroso precursor or combinations thereof.

In one aspect, the curable composition of the invention may further comprise a sulfur impregnated particulate solid which acts as a release agent for sulfur during the cure process. Desirably. the curable composition comprises
a) one or more reactive components that cure upon exposure to suitable conditions, and b) a sulfur impregnated particulate solid which acts as a release agent for sulfur during the cure process; and
c) optionally a solvent.

Reactive components that cure are described above.

The solvent is a preferred example of a suitable carrier vehicle may be utilised with any of the various improved composition of the invention described herein. It is desirable that the carrier vehicle, for example, solvent is environmentally friendly. For example, the solvent may be an aqueous-based solvent. The solvent may further comprise an organic solvent. Desirably, the organic solvent is miscible with water. This allows for efficient dissolution of and hydrolysis of the nitrososilane. The organic solvent may be selected from the group consisting of alcohols, carboxylic acids, acetone, acetonitrile, and tetrahydrofuran. The organic solvent may be an alcohol. Suitable alcohols include, without limitation, methanol, ethanol, propanol and isomers thereof, butanol and isomers thereof, and pentanol and isomers thereof.

Use of a sulfur-impregnated particulate solid in curing applications or curable compositions acts as an effective source of sulfur which can be released under application of suitable conditions to participate in the curing process. The sulfur-impregnated particulate solid improves the bond durability and resistance in many applications, and such as, under harsh conditions for example those where moisture is present and/or elevated pressures or temperatures. The increased durability and bond resistance can be imparted to existing curable compositions to further improve the effectiveness of bonding for example during the various bonding processes and including vulcanisation processes. It is to be appreciated that the solid is not itself solid sulfur or particulate sulfur materials. Rather, the particulate solid material acts as a carrier material for the sulfur, which is impregnated therein. By solid, it is meant that the material is solid at a temperature of 22° C., and preferably solid at 50° C., 60° C., 70° C. 80° C. or 100° C. It should also be appreciated that impregnated sulfur means that the sulfur is releasably trapped within the particulate solid by means of, for example, dispersion, adsorption, trapping or immobilisation. It is preferred that the sulfur is impregnated within the particulate solid material by adsorption. Furthermore, impregnated means that the sulfur is dispersed throughout the particulate solid material, i.e., a substantial proportion of the sulfur is located within (inside) the particulate solid, and that amounts of sulfur may be located on the surface of the particulate solid. The It is also important to appreciate that sulfur release from the sulfur impregnated particulate solid is latent. The latency is thermal latency meaning that at room temperature (approx. 22° C.) the sulfur impregnated particulate solid does not release sufficient quantities of sulfur, but on heating the sulfur is released from the particulate solid material. It is to be appreciated that for sulfur release, there is no requirement for rupture or breakage of the particulate solid material to effect such release, application of sufficient heat is required to release the trapped sulfur. It should be appreciated at temperatures of above 50° C. a small amount of sulfur is released. Suitably, at temperatures of above 60° C., a greater quantity of sulfur is released. More suitably still, at temperatures of above 70° C., a greater quantity still of sulfur is released. It is to be appreciated that temperatures of above 80° C., provide an optimum quantity of sulfur is released. Selection of appropriate temperature allows the rate of release of sulfur to be controlled. The sulfur may be released by a diffusion process whereby the sulfur is released from its association with the particulate solid. Alternatively, sulfur may be released by a vaporisation process in which sulfur is typically sublimated at sufficiently elevated temperatures.

Desirably, the sulfur impregnated particulate solid used in the compositions of the invention are latent sulfur releasing particulate solid. Typically, at room temperature little or no sulfur is released, whereby the sulfur releasing ability desirably increases at elevated temperatures, typically through a sublimation process. The particulate solid may be a solid, such as a granular solid, such as a powder. The particulate solid may be an amorphous solid.

Suitably, the sulfur content of the particulate solid used is in the range of from about 0.5 to about 20% w/w of the sulfur impregnated particulate solid, more preferably, from about 1.0 to about 15% w/w of the sulfur impregnated particulate solid. Suitably the sulfur content of the sulfur impregnated particulate solid used in the various improved compositions of the invention is about 1.5 to about 12% w/w. A particularly preferred sulfur content is about 12% w/w of the sulfur impregnated particulate solid.

Suitably, the sulfur impregnated particulate solid used is in the range of from about 0.5 to about 10% w/w of (the total weight of) the curable composition, more preferably from about 1 to about 5% w/w of (the total weight of) the curable composition. Suitably, the sulfur impregnated particulate solid used in the various improved compositions of the invention is about 2.5% w/w (the total weight of) the curable composition.

The sulfur impregnated particulate solid of the invention has an average particle size of from about 1 to 200 µm. Suitably, the average particle size is less than 10 µm.

As used herein, the term "average particle size" refers to the $D_{50}$ value of the cumulative volume distribution curve at which 50% by volume of the particles have a diameter less than said value. The average particle size or $D_{50}$ value is measured in the present invention through laser diffractometry preferably using a Malvern Mastersizer 2000 available from Malvern Instruments Ltd. In this technique, the size of particles in suspensions or emulsions is measured using the diffraction of a laser beam, based on application of either Fraunhofer or Mie theory. In the present invention, Mie theory or a modified Mie theory for non-spherical particles is applied and the average particle sizes or $D_{50}$ values relate to scattering measurements at an angle from 0.02 to 135 degrees relative to the incident laser beam.

Desirably, the sulfur impregnated particulate solid used in the improved composition of the invention have a BET surface area of from about 500 m$^2$/g to 1200 m$^2$/g, more suitably from about 600 m$^2$/g to 1100 m$^2$/g, more suitably still from about 700 m$^2$/g to 1000 m$^2$/g, as determined by the ASTM method D6556-10. Particularly good bond durability and bond resistance may be achieved with sulfur impregnated particulate solid having BET surface area of 700 m$^2$/g and 1000 m$^2$/g as determined by the ASTM method D6556-10.

Example of sulfur impregnated particulate solids include sulfur-impregnated clays, silicates, aluminates, charcoals or carbon materials such as carbon black. Desirably, the sulfur-impregnated particulate solid is a sulfur impregnated carbon black or a sulfur impregnated charcoal. Preferably, the sulfur-impregnated particulate solid is at least one sulfur impregnated charcoal. The sulfur-impregnated particulate solid may be formed by burning a suitable raw material, for example, coal or biomaterials, such as coconut husks, thereby forming a carbonaceous particulate material that has a suitable sulfur loading for the purposes of the present invention.

It should also be appreciated that a single grade of sulfur impregnated particulate solid or mixtures of at least two grades sulfur impregnated particulate solid (as discussed above for particle sizes, sulfur contents, surfaces areas) can be used in the improved compositions of the invention.

The provision of heat to the improved compositions of the invention may aid in the controllable release of the sulfur from the particles or particular of the improved curable compositions of the invention. Suitably, the composition may be cured at a temperature greater than 100° C., and suitably, between 120-200° C. Suitably, the composition may be heated to a temperature between 150-190° C. The composition may be heated to 180° C., which is a reasonably cost effective process temperature that gives excellent cure and cure rates.

The composition may be heated for up to 5 hours, depending on the type of bonding application and conditions necessary for cure (for example, higher temperatures and pressures require less curing time). Suitably, the composition may be heated for up to 3 hours, for example, under conditions involving mid range temperature and/or pressures. Desirably, the composition may be heated for up to 30 minutes, for example, where high temperatures and/or pressures are used. It will be appreciated that the improved curable compositions comprising the aforementioned film formers, may also comprise any conventional curing components or mixtures of components, such as alkoxy silanes and aromatic nitroso compounds or precursor compounds (examples of these components and compositions are disclosed in International publication WO 2011/029752, the contents of which are incorporated herein by reference). Such nitroso structures are recognised in the art to assist in the formation of desirable bonds to polymeric substrates, such as elastomeric substrates. These conventional components are known to form good quality bonds, the durability and resistance of which, in certain applications, is increase by inclusion of the aforementioned sulfur impregnated particulate solid.

It will also be appreciated that where the improved compositions of the invention also comprise compounds having both alkoxy silane moiety and aromatic nitroso or an aromatic nitroso precursor moieties in the same molecule, as such compositions will assist in the formation of excellent polymer to substrate bonds, and in particular, the formation of rubber to metal bonds. Advantageously, inclusion of such dual moiety compounds (known as nitrososilanes) in the improved composition of the invention, particularly when used together with sulfur impregnated particulate solid, assist in development of particularly durable and resistance bonds during the curing process. Suitable nitrososilanes are also disclosed above herein and in U.S. patent application Ser. No. 12/055,908, the disclosure of which is hereby incorporated herein by reference. One advantage arising from use of nitrososilanes in curing compositions is that the compositions may be less toxic compared to conventional dinitrosobenzenes formulations (no free or untethered nitrosobenzene compounds are formulated within the composition). Furthermore, inclusion of these nitrososilane compounds may also facilitate formulation of one part improved curable composition systems via conventional application techniques, such as spraying and dipping. One part systems can be readily applied to substrates in a single step using these convenient and conventional techniques. Compositions of the present invention may also be two-part compositions.

A number of the improved compositions of the present invention possess a number of advantages. For example, an improved curable composition absent conventional dinitrosobenzene may be formulated and stored. Such formulations are easily and conveniently applied to substrates in a standard manner. Furthermore, the improved compositions as so provided can also achieve, on curing, excellent bond strengths to polymeric materials, such as elastomers, for example rubbers (natural or synthetic). For example, in rubber to metal bonding tests to determine the bond strength of the compositions of the present invention, up to 80% rubber failure may be observed. Furthermore, the resultant bonds may have hot water resistance.

As used herein, the terms "elastomer", "elastomeric substrate" or "elastomeric material" are used interchangeably in the present invention. The terms preferably refer to a material that can undergo a substantial elongation and then returns to its approximately original dimensions upon release of the stress elongating the material. More preferably the elastomeric substrate has a permanent set of less than 50%, such as less than 30% or less than 10% after one minute when recovering from a strain of 100% applied for one minute at a temperature of 22° C. In one embodiment the elastomer or elastomeric substrate may be selected from natural or synthetic rubbers, wherein the improved curable compositions of the present invention are particularly suitable for bonding polar rubbers, like nitrile butadiene rubbers (NBR), hydrogenated nitrile butadiene rubbers (HNBR) and/or ethylene acrylic elastomers to rigid substrates, such as metallic substrates. The synthetic rubber may be a nitrile butadiene rubber (HNBR). The polymer may be a $C_2$-$C_{1,000,000}$ polymer, such as a $C_2$-$C_{10,000}$ polymer. Other suitable polymers, include those capable of reacting with nitroso groups so as to provide cross-links therebetween. Such a reaction produces a variety of cross-links, for example between the nitroso group and a rubber material. The materials of the invention are thought to reduce free nitroso groups as the nitroso group is within a molecular structure.

Suitably, the improved compositions of the invention may also be used in vulcanisation application as well as bonding of polymeric substrates, such as elastomeric substrates to any of a wide variety of useful materials, including for example other elastomers, non-elastomeric but flexible materials such as for example fabrics or films, and rigid materials such as plastics, engineering plastics, wood, metal, glass or other hydroxylated substrates. In embodiment having sulfur releasing particulate solids as part of the composition, the improved compositions of the invention improve the adhesion provided by known compositions whereby durability of the bond between substrate is improved as a result of the presence of sulfur releasing particulate solid in the improved composition.

In examples utilising an elastomeric, such as a rubber substrate, the elastomer may be vulcanised or crosslinked prior to bonding to the second substrate. Alternatively, the elastomeric substrate may be vulcanised or crosslinked concurrently with bonding to the second substrate. The second substrate may be a metal. The nitroso aromatic compound of the composition of the present invention may become anchored to the elastomeric substrate. On polymerisation, the nitroso groups of the compounds of the composition can react with polymers, in particular a polymer with diene or allylic functionality within the polymer chain. Reaction of a nitroso group and an allylic group on the polymer occurs via an alder-ene reaction. Such a reaction produces a variety of cross-links, for example between the nitroso group and a elastomeric material.

Suitably, the improved composition of the invention may be preferably used for bonding polar elastomeric materials, such as nitrile butadiene rubbers (NBR), hydrogenated nitrile butadiene rubbers (HNBR) and/or ethylene acrylic elastomers to metallic substrates.

In contrast to conventional systems, the improved compositions of the present invention can be applied to the unvulcanised rubber (as distinct from a metal or glass substrate), prior to vulcanisation and bond formation, and upon subsequent vulcanization a bond results. This means that the improved compositions may be applied to either the rubber or the metal or the hydroxylated surface. Conventional systems do not form a bond if applied in this manner. Alternatively, the improved compositions may be applied to a metal or a hydroxylated surface. This means that application to either the polymeric substrate such as a rubber or a metal or glass substrate or unvulcanised rubbers are both possible. Thus a rubber substrate may be vulcanised or crosslinked prior to bonding to the metal or hydroxylated surface. The rubber substrate may be vulcanised or cross-linked concurrently with bonding to the metal surface.

The compositions of the present invention are coated in the range of 10 to 60 μm, and more preferably in the range of 20 to 30 μm.

Generally, it is desirable that bonding is achieved during a vulcanisation step. Suitable vulcanisation methods include compression moulding, transfer moulding, injection moulding and autoclave heating, for example with steam or hot air. For example semi-solid rubber can be injected into a mould. The semi-solid rubber is then cross-linked into a fully cured rubber and the bond with the substrate is formed at the same time.

Certain requirements must be fulfilled by a curing system in order to allow it to be successfully employed in a production environment. For example, the curing system must be easy to process. This means that it should be stable for use. Issues with the prior compositions have included a tendency to sediment. Accordingly, it is desirable that the curing system has a low tendency to sediment.

Furthermore, the curing system should be easy to apply. For example, it should be convenient to apply by any suitable dispensing system. It is also desirable that it dries quickly so that components can be handled without applied material running off and/or fouling production equipment. It is also desirable that the curing system shows good wetting properties for ease of application and spreading, for instance.

It is also desirable to have good curing strengths. This curing should be achieved independently of the type of elastomer (rubber) employed and also independently of the type of substrate. It will be appreciated that some rubbers are blended materials and accordingly it is desirable that good curing is achieved with such blended materials. Suitably consistent curing is achieved under various process parameters.

It is desirable that the bonds and in particular the substrate/metal bond, such as rubber/metal joint, are durable under high pressure and even if exposed to an aggressive atmosphere, for example, a hot liquid such as oil. The bonds must also be durable against relatively high mechanical stress, under conditions involving any of high pressure, temperature and/or moisture. Advantageously, inclusion of the sulfur releasing particulate solid in the compositions of the invention increases bond durability and in particular under conditions of moisture and/or elevated temperatures or pressures.

The improved compositions of the invention can be easily applied at the interface between the polymer and the substrate and may assist in developing strong and durable bonds during the curing process.

Desirably, in the improved compositions of the invention, the composition may further comprise a carrier, for example, a solvent, for the above mentioned compounds. It will be appreciated that any suitable carrier vehicle may be utilised with any of the various improved composition of the invention described herein. It is desirable that the carrier vehicle is environmentally friendly. For example, the carrier vehicle may be an aqueous-based vehicle.

It will be appreciated, that, as described above, the presence of water in the improved composition of the present invention facilitates substantial hydrolysis of the nitrososilane. At least one alkoxy moiety in the compound may be hydrolysed to ensure good bonding. The carrier may further comprise an organic solvent. Desirably, the organic solvent is miscible with water. This allows for efficient dissolution of and hydrolysis of the nitrososilane. The organic solvent may be selected from the group consisting of alcohols, carboxylic acids, acetone, acetonitrile, and tetrahydrofuran. The organic solvent may be an alcohol. Suitable alcohols include, without limitation, methanol, ethanol, propanol and isomers thereof, butanol and isomers thereof, and pentanol and isomers thereof.

In the relevant embodiments, the solvent, of the improved compositions of the present invention may comprise between from 0.1-100% w/w water. The solvent of the improved composition of the present invention may comprise between 0.5-50% w/w water. The solvent of the improved composition of the present invention may comprise between 1-20% w/w water. Suitably, a solvent comprising about 5% w/w water is suitably to substantially hydrolyse the nitrososilanes.

Desirably, the solvent consists of water and an alcohol. An alcohol:water solvent provides for dissolution of the nitrososilane in the carrier, thereby enabling uniform application of the compound as a film or coating to a target substrate. Uniform application of the nitrososilane compound as part of a composition may result in improved bonding.

The composition of the present invention may further comprise an acid. Suitable acids include organic acids. For example, acetic acid, oxalic acid, formic acid, and propionic acid.

Suitably, the solvent of the composition may comprise between 0.1-100% w/w water. The solvent of the composition may comprise between 0.5-50% w/w water. The solvent may comprise between 1-20% w/w water. Suitably, a solvent comprising about 5% w/w water may substantially hydrolyse the nitrososilanes.

Hydrolysis of alkoxy silanes (formation of silanol groups, i.e. SiOH) will generally occur efficiently within the pH range of 3-7. At a pH above or below this range, silane condensation may occur by a process where the silanol self-condenses to form a siloxane. During this process the hydroxyl molecules of the adjacent molecules react with one another to eliminate molecules of water and form a cross-linked siloxane structure containing —Si—O—Si—O—Si— functionality. To accelerate silane hydrolysis and inhibit silane condensation during the hydrolysis step, the pH of the silane solution may be maintained below about 7 and preferably in the mildly acidic range from about 4 to 6.5.

In a preferred second embodiment, in additional to the aforementioned film former, the improved curable compositions may further comprise a solvent comprising at least 0.1% water. Examples of such compositions (but without the film former of the present invention) may be found in International publication WO 2011/029752, the contents of which are incorporated herein by reference.

Such compositions are particularly useful in bonding polymers to metal or hydroxylated surfaces. The solvent comprising at least 0.1% w/w water may allow for hydrolysis of the compound comprising the at least one alkoxy silane moiety.

As used herein hydrolysis of the compound refers to hydrolysis of the alkoxy silane moiety, i.e., hydrolysis of any alkoxy moiety to yield a hydroxy moiety. At least one alkoxy moiety in the compound may be hydrolysed to ensure good bonding. Advantageously, hydrolysis of the compound prior to bonding may result in improved adhesion. Hydrolysis of the compound prior to bonding may result in improved bond strengths. Hydrolysis of the compound prior to bonding may result in improved bond strengths in bonding a polymeric substrate having diene and or allylic functionality within the polymer chain to a metal or hydroxylated surface.

It should be appreciated that, as used herein the term hydroxylated surface refers to any substrate with a surface comprising an atom bonded to a hydroxy group. Suitable non-limiting examples include, a hydrous metal oxide, glass substrates comprising surface Si—OH bonds or clay substrates comprising surface Al—OH bonds. Suitable hydroxylated surfaces include those of silicates, aluminates, germanates and combinations thereof. The hydroxylated surface may be a silicate, an aluminate or combinations thereof. As used herein, the term silicate refers to substrates comprising Si—OH bonds. The term aluminate refers to substrates having Al—OH bonds and the term germanate refers to substrates having Ge—OH bonds. As used herein, hydroxylated surface also comprises substrates primed with hydroxylated materials, for example primed with a silicate, aluminate, germanate and combinations thereof. For example, the hydroxylated surface may be one of glass such as glass fibres, quartz, clays, talcs, zeolites, porcelains, ceramics, and silicon substrates such as silicon wafers and combinations thereof.

The various improved compositions of the present invention may be utilised to bond a polymeric substrate as defined above to a second substrate, which may be an elastomer, a metal, glass or other hydroxylated surface as defined above. The compositions having carrier and water, are particularly useful for bonding a polymeric substrate to a metal or hydroxylated surface.

Many different metals may be treated with the various improved compositions of the present invention. Suitable metals include, but are not limited to, zinc and zinc alloys such as zinc-nickel and zinc-cobalt alloys, metal substrates having zinc-containing coatings, steel and in particular cold rolled and carbon steel, aluminium and aluminium alloys, copper and copper alloys such as brass, and tin and tin alloys including metal substrates having tin-containing coatings.

Within the context of this specification, it is to be appreciated that the term aromatic nitroso moiety refers to an aromatic moiety having at least one nitroso group. Similarly, the term aromatic nitroso precursor moiety refers to any compound that is capable of being transformed into an aromatic nitroso moiety with at least one nitroso group. Preferred aromatic nitroso precursors are oximes. The term aromatic comprises both fused and non-fused aromatic rings. For example, a non-limiting selection of fused and non-fused aromatic nitroso moieties embraced by the present invention are detailed below:

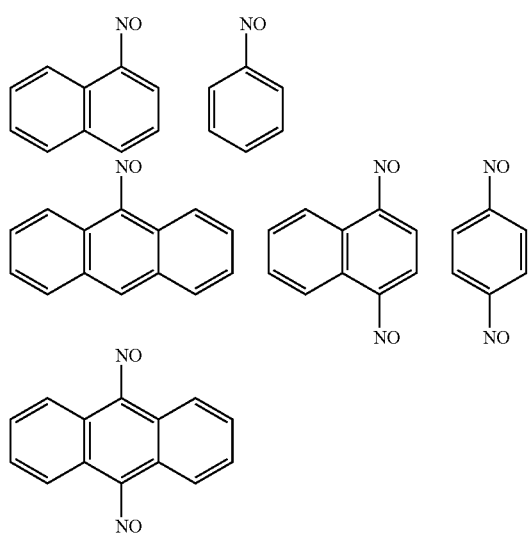

As will be appreciated by a person skilled in the art, the nitroso compounds or structures disclosed above may optionally be substituted one or more times, for example with at least one of $C_1$-$C_{20}$ alkyl, $C_1$-$C_{20}$ cycloalkyl, $C_1$-$C_{20}$ alkoxy, $C_7$-$C_{20}$ aralkyl, $C_7$-$C_{20}$ alkaryl, $C_6$-$C_{20}$ arylamine, $C_6$-$C_{20}$ arylnitroso, cyano, amino, hydroxy, halogen and combinations thereof. Such substitutions are possible provided there is no interference with effective bonding or curing of the compositions.

The at least one moiety selected from an aromatic nitroso or an aromatic nitroso precursor and combinations thereof may be selected from a nitrosobenzene or a nitrosobenzene precursor and combinations thereof.

The nitrosobenzene compound may be a mononitrosobenzene compound, a dinitrosobenzene compound, or combinations thereof.

Desirably compositions of the present invention may find utility in bonding a substrate to a natural or synthetic rubber. For example, the compositions may be used for applications where bonding metal to natural or synthetic rubber is required. In particular, the improved compositions of the present invention will provide for in-situ generation of a nitrosobenzene moiety or a dinitrosobenzene moiety. For example, to achieve good bonding it may be desirable for the compound to react in-situ to form a nitroso aromatic moiety comprising a hydroxy group. The nitroso aromatic moiety comprising a hydroxy group may be a para-nitrosophenol moiety. The phenolic moiety present may help to anchor the para-nitrosophenol moiety to a metal surface. para-Nitrosophenol may be generated in-situ from the oxidation of quinone mono-oxime as shown below for information purposes:

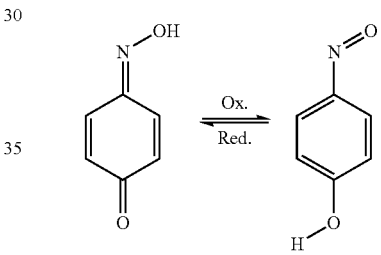

As will be appreciated by a person skilled in the art, references to nitrosobenzene and nitrosobenzene precursor moieties include nitrosobenzene and nitrosobenzene precursor moieties that may optionally be substituted one or more times with at least one of $C_1$-$C_{20}$ alkyl, $C_3$-$C_{20}$ cycloalkyl, $C_1$-$C_{20}$ alkoxy, $C_7$-$C_{20}$ aralkyl, $C_7$-$C_{20}$ alkaryl, $C_6$-$C_{20}$ arylamine, $C_6$-$C_{20}$ arylnitroso, cyano, amino, hydroxy, halogen and combinations thereof. Such substitutions are possible provided there is no interference with effective bonding or curing of the compositions. For example, provided there is no interference with the generation of a nitrosobenzene moiety in-situ.

It will be appreciated that the nitrosobenzene precursor may form a nitrosobenzene structure in-situ. The nitrosobenzene precursor may be an aromatic oxime, for example at least one of a quinone dioxime or a quinone oxime or combinations thereof. Desirably, the aromatic nitroso compound precursor is selected from the group consisting of p-benzoquinone dioxime (QDO), naphthoquinone dioxime, toluquinone dioxime, diphenoquinone dioxime, diquinoyl dioxime, dibenzoyl dioxime and combinations thereof. The above list serves as a generalised example only and other aryl oximes and dioximes are possible and embraced by the present invention. Desirably, the nitrosobenzene precursor comprises p-benzoquinone oxime or p-benzoquinone dioxime (QDO). QDO is generally used as a vulcanizing agent for EPDM (ethylene-propylene diene monomer) to improve heat resistance. It is also used as a rubber to metal adhesion promoter and as a curing agent. It has been found that such structures assist in the formation of desirable bonds.

Suitably, the aromatic nitroso compound is selected from the group consisting of m-dinitrosobenzene, p-dinitrosobenzene, m-dinitrosonaphthalene, p-dinitrosonaphthalene, 2,5-dinitroso-p-cymeme, 2-methyl-1,4-dinitrosobenzene, 2-methyl-5-chloro-1,4-dinitrosobenzene, 2-fluoro-1,4-dinitrosobenzene, 2-methoxy-1-3-dinitrosobenzene, 5-chloro-1,3-dinitrosobenzene, 2-benzyl-1,4-dinitrosobenzene, 2-cyclohexyl-1,4-dinitrosobenzene and combinations thereof.

A general scheme for the oxidation of quinone dioxime to the dinitrosobenzene species using an oxidant, such as benzoyl peroxide (BPO), is shown below, for information purposes:

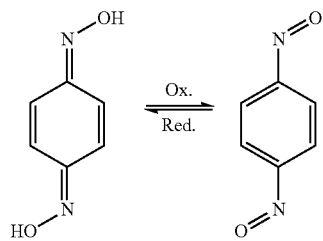

The at least one aromatic nitroso compound precursor may be present in an amount of 1 to 20% w/w of the total composition. Suitably, the at least one aromatic nitroso compound precursor may be present in an amount of 1 to 10% w/w, for example 2 to 7% w/w. The at least one aromatic nitroso compound precursor may be present in 3% w/w of the total composition.

For example, the aromatic nitroso precursor moiety may be the mono- or dioxime of a compound selected from:

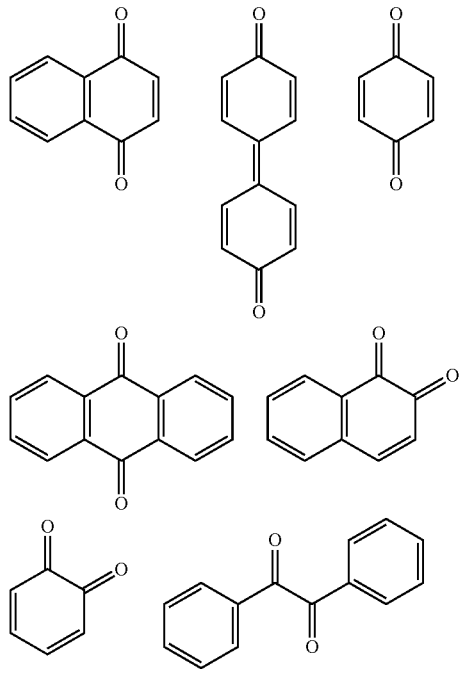

As will be appreciated by a person skilled in the art, the diketone structures disclosed above may optionally be substituted one or more times, for example with at least one of $C_1$-$C_{20}$ alkyl, $C_3$-$C_{20}$ cycloalkyl, $C_1$-$C_{20}$ alkoxy, $C_7$-$C_{20}$ aralkyl, $C_7$-$C_{20}$ alkaryl, $C_6$-$C_{20}$ arylamine, $C_6$-$C_{20}$ arylnitroso, cyano, amino, hydroxy, halogen and combinations thereof. Such substitutions are possible provided there is no interference with effective bonding or curing of the compositions, for example, with the generation of an aromatic nitroso compound in-situ.

As will be appreciated by a person skilled in the art, references to nitrosobenzene and nitrosobenzene precursor moieties include nitrosobenzene and nitrosobenzene precursor moieties that may optionally be substituted one or more times with at least one of $C_1$-$C_{20}$ alkyl, $C_3$-$C_{20}$ cycloalkyl, $C_1$-$C_{20}$ alkoxy, $C_7$-$C_{20}$ aralkyl, $C_7$-$C_{20}$ alkaryl, $C_6$-$C_{20}$ arylamine, $C_6$-$C_{20}$ arylnitroso, cyano, amino, hydroxy, halogen and combinations thereof. Such substitutions are possible provided there is no interference with effective bonding or curing of the compositions. For example, provided there is no interference with the generation of a nitrosobenzene moiety in-situ.

Suitably, in the improved composition of the invention, the above mentioned nitrososilane compounds may have an alkoxy silane moiety of the general structure:

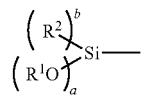

wherein a is from 1 to 3, b is from 0 to 2, with the proviso that a+b=3; each $R^1$ is independently selected from the group consisting of H, $C_1$-$C_{24}$ alkyl, and $C_3$-$C_{24}$ acyl, preferably from $C_1$-$C_4$ alkyl and wherein when a≥1 at least one $R^1$ is not hydrogen; and each $R^2$ is independently selected from the group consisting of $C_1$-$C_{24}$ alkyl and $C_3$-$C_{24}$ acyl, preferably from $C_1$-$C_4$ alkyl.

In one embodiment, a is 3 and $R^1$ is $C_1$-$C_{24}$ alkyl. $R^1$ may be $C_1$-$C_4$ alkyl and a may be 3.

The compounds may be reaction products derived from an isocyanate or isothiocyanate and an active hydrogen compound, such as —$NH_x$ (where x=1 or 2), —SH, or —OH. In this manner the so-described compounds should contain at least one linkage described by:

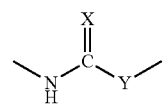

where X can be S or O, and Y includes —$NH_x$ (where x=1 or 2), —S, or —O.

The general structure for the compounds is shown below:

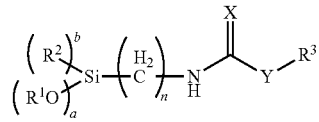

wherein n is from 1 to 20; a is from 1 to 3, b is from 0 to 2, with the proviso that a+b=3; each $R^1$ is independently selected from the group consisting of H, $C_1$-$C_{24}$ alkyl, and $C_3$-$C_{24}$ acyl, preferably from $C_1$-$C_4$ alkyl and wherein when a≥1 at least one $R^1$ is not hydrogen; each $R^2$ is independently selected from the group consisting of $C_1$-$C_{24}$ alkyl and $C_3$-$C_{24}$ acyl, preferably from $C_1$-$C_4$ alkyl; X is O or S; Y is O, S, or N($R^3$); and $R^3$ is a moiety comprising nitrosobenzene, quinone oxime or quinone dioxime.

Desirably, $R^3$ may be a moiety comprising nitrosobenzene, quinone dioxime or quinone oxime.

$R^1$ may be selected from $C_1$-$C_{24}$ alkyl, $C_3$-$C_{24}$ acyl. $R^1$ may be selected from $C_1$-$C_{24}$ alkyl, $C_3$-$C_{24}$ acyl and 'a' may be 3. X may be O. Y may be O or —$NH_x$ (where x=1). Y may be O. X and Y may be O. $R^1$ may be selected from $C_1$-$C_4$ alkyl, X may be O and 'a' is 3. $R^1$ may be selected from $C_1$-$C_4$ alkyl, X may be O, Y may be O and 'a' may be 3. $R^1$ may be selected from $C_1$-$C_4$ alkyl, X may be O, Y may be —$NH_x$ (where x=1) and 'a' may be 3. $R^1$ may be selected from $C_1$-$C_4$ alkyl, X may be O, Y may be O, 'a' may be 3 and $R^3$ may be a moiety comprising nitrosobenzene.

Structures for $R^3$, showing the linkage through 'Y', can include:

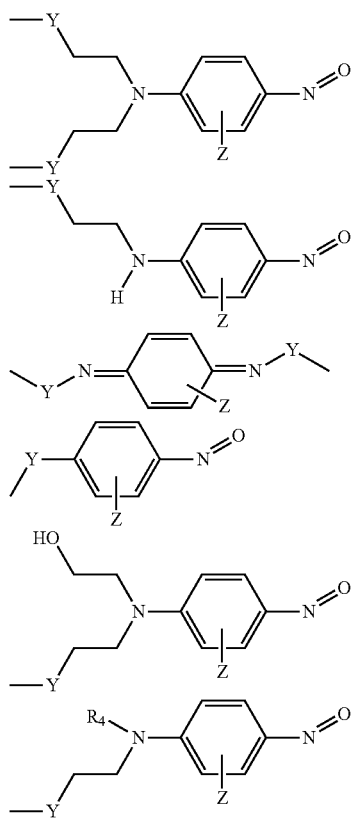

where $R_4$ can be $C_1$ to $C_{10}$; and
Z indicates that the rings of the above structures can optionally be mono-, di-, tri- or tetrasubstituted with the group consisting of $C_1$-$C_{20}$ alkyl, $C_3$-$C_{20}$ cycloalkyl, $C_1$-$C_{20}$ alkoxy, $C_7$-$C_{20}$ aralkyl, $C_7$-$C_{20}$ alkaryl, $C_5$-$C_{20}$ arylamine, $C_5$-$C_{20}$ arylnitroso, amino, hydroxy, halogen and combinations thereof, and further where the substituents can either be the same or different on each carbon atom of the ring. Such substitutions may be possible provided there is no interference with effective bonding or curing of the compositions. For example, provided there is no interference with the generation of a nitrosobenzene compound in-situ.

One exemplary, the compound utilised one composition of the present invention may have the general structure:

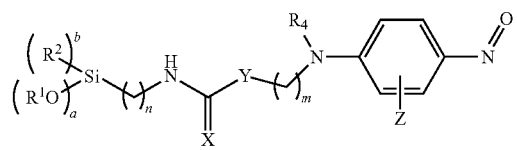

where 'a' can be 1-3 and 'b' can be 0-2; wherein a+b=3 and at least one alkoxy group is present;

$R^1$ can be selected from H, $C_1$-$C_{24}$ alkyl, $C_3$-$C_{24}$ acyl, preferably from $C_1$-$C_4$ alkyl and where when a≥1 at least one $R^1$ is not hydrogen; and $R^2$ can be selected from $C_1$-$C_{24}$ alkyl and $C_3$-$C_{24}$ acyl, preferably from $C_1$-$C_4$ alkyl;

m and n can be the same or different and can be 1-10;

X can be O or S;

Y can be —O, —S, or —NH;

$R_4$ can be $C_1$ to $C_{10}$; and

Z indicates that the rings of the above structures can optionally be mono-, di-, tri- or tetrasubstituted with the group consisting of $C_1$-$C_{20}$ alkyl, $C_3$-$C_{20}$ cycloalkyl, $C_1$-$C_{20}$ alkoxy, $C_7$-$C_{20}$ aralkyl, $C_7$-$C_{20}$ alkaryl, $C_5$-$C_{20}$ arylamine, $C_5$-$C_{20}$ arylnitroso, amino, hydroxy, halogen and combinations thereof, and further wherein the substituents can either be the same or different on each carbon atom of the ring. Such substitutions may be possible provided there is no interference with effective bonding or curing of a bonding composition comprising the compound.

$R^1$ may be selected from $C_1$-$C_{24}$ alkyl or $C_3$-$C_{24}$ acyl. $R^1$ may be selected from $C_1$-$C_{24}$ alkyl, $C_3$-$C_{24}$ acyl and 'a' may be 3. X may be O. Y may be O or NH. Y may be O. X and Y may be O. n may be $C_2$-$C_5$ alkyl. m may be $C_2$-$C_5$ alkyl. $R^1$ may be selected from $C_1$-$C_4$ alkyl, X may be O and 'a' is 3. $R^1$ may be selected from $C_1$-$C_4$ alkyl, X may be O, Y may be O and 'a' may be 3. $R^1$ may be selected from $C_1$-$C_4$ alkyl, X may be O, Y may be NH and 'a' may be 3. $R^1$ may be selected from $C_1$-$C_4$ alkyl, X may be O, Y may be O, 'a' may be 3 and $R^4$ may be $C_1$ to $C_{10}$.

Desirably, the compounds in the above-mentioned composition of the present invention may have the general structure:

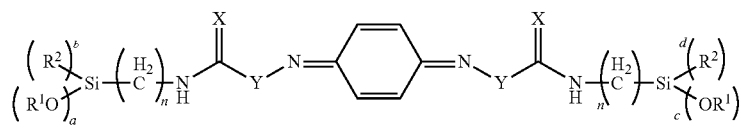

where n can be 1-10;
'a' can be 1-3 and 'b' can be 0-2; wherein a+b=3 and at least one alkoxy group is present;
c can be 'a' or 1 to 3; d can be 'b' or 1 to 3;
$R^1$ can be selected from H, $C_1$-$C_{24}$ alkyl, $C_3$-$C_{24}$ acyl, preferably from $C_1$-$C_4$ alkyl and where when a≥1 at least one $R^1$ is not hydrogen;
$R^2$ can be selected from $C_1$-$C_{24}$ alkyl and $C_3$-$C_{24}$ acyl, preferably from $C_1$-$C_4$ alkyl;
X can be O or S; and
Y can be —O, —S, or —$NH_x$ (where x=1 or 2).

$R^1$ may be selected from $C_1$-$C_{24}$ alkyl, $C_3$-$C_{24}$ acyl. $R^1$ may be selected from $C_1$-$C_{24}$ alkyl, $C_3$-$C_{24}$ acyl and 'a' may be 3. X may be O. Y may be O or —$NH_x$ (where x=1). Y may be O. X and Y may be O. $R^1$ may be selected from $C_1$-$C_4$ alkyl, X may be O and 'a' is 3. $R^1$ may be selected from $C_1$-$C_4$ alkyl, X may be O, Y may be O and 'a' may be 3. $R^1$ may be selected from $C_1$-$C_4$ alkyl, X may be O, Y may be —$NH_x$ (where x=1) and 'a' may be 3. $R^1$ may be selected from $C_1$-$C_4$ alkyl, X may be O, Y may be O, n may be 3 and 'a' may be 3.

In a further embodiment, the above described compound of the above improved composition of the present invention may be an oligomeric or co-oligomeric compound of the general structure:

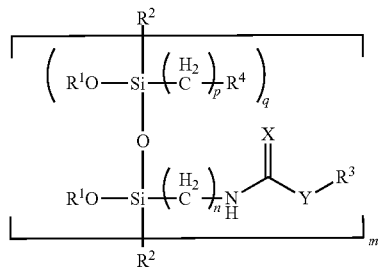

where m can be 1-100; n can be 1-10; p can be 1-10; q can be 0-50; and if q=0, m≥2;

$R^1$ can be selected from H, $C_1$-$C_{24}$ alkyl, $C_3$-$C_{24}$ acyl, and preferably from $C_1$-$C_4$ alkyl;
$R^2$ can be selected from $OR^1$, $C_1$-$C_{24}$ alkyl and $C_3$-$C_{24}$ acyl, and where when $R^2$=$OR^1$ at least one $R^1$ is not hydrogen;
$R^4$ can be selected from acrylate, aldehyde, amino, anhydride, azide, maleimide, carboxylate, sulphonate, epoxide, ester functional, halogens, hydroxyl, isocyanate or blocked isocyanate, sulfur functional, vinyl and olefin functional, or polymeric structures;
X can be O or S;
Y can be —O, —S, or —$NH_x$ (where x=1 or 2); and
$R^3$ may be a moiety comprising nitrosoaromatic, or a nitrosoaromatic precursor as defined herein.

$R^3$ may be a moiety comprising nitrosobenzene, quinone dioxime or quinone oxime.

$R^1$ may be selected from $C_1$-$C_{24}$ alkyl, $C_3$-$C_{24}$ acyl. $R^1$ may be selected from $C_1$-$C_{24}$ alkyl, $C_3$-$C_{24}$ acyl and $R^2$ may be $OR^1$. X may be O. Y may be O or —$NH_x$ (where x=1). Y may be O. X and Y may be O. $R^1$ may be selected from $C_1$-$C_4$ alkyl, X may be O and $R^2$ may be $OR^1$. $R^1$ may be selected from $C_1$-$C_4$ alkyl, X may be O, Y may be O and $R^2$ may be $OR^1$. $R^1$ may be selected from $C_1$-$C_4$ alkyl, X may be O, Y may be —$NH_x$ (where x=1) and $R^2$ may be $OR^1$. $R^1$ may be selected from $C_1$-$C_4$ alkyl, X may be O, Y may be O, n may be 3, $R^2$ may be $OR^1$ and $R^3$ may be a moiety comprising nitrosobenzene. $R^1$ may be selected from $C_1$-$C_4$ alkyl, X may be O, Y may be O, n may be 3, $R^2$ may be $OR^1$, $R^3$ may be a moiety comprising nitrosobenzene, q may be O, and m may be ≥2. R' may be selected from $C_1$-$C_4$ alkyl, X may be O, Y may be O, n may be 3, $R^2$ may be $OR^1$, $R^3$ may be a moiety comprising nitrosobenzene, q may be O, m may be and $R^4$ may be vinyl or ester.

Specific examples of the above mentioned nitrososilane compounds used in the improved compositions of the first embodiment of the present invention may include the following:

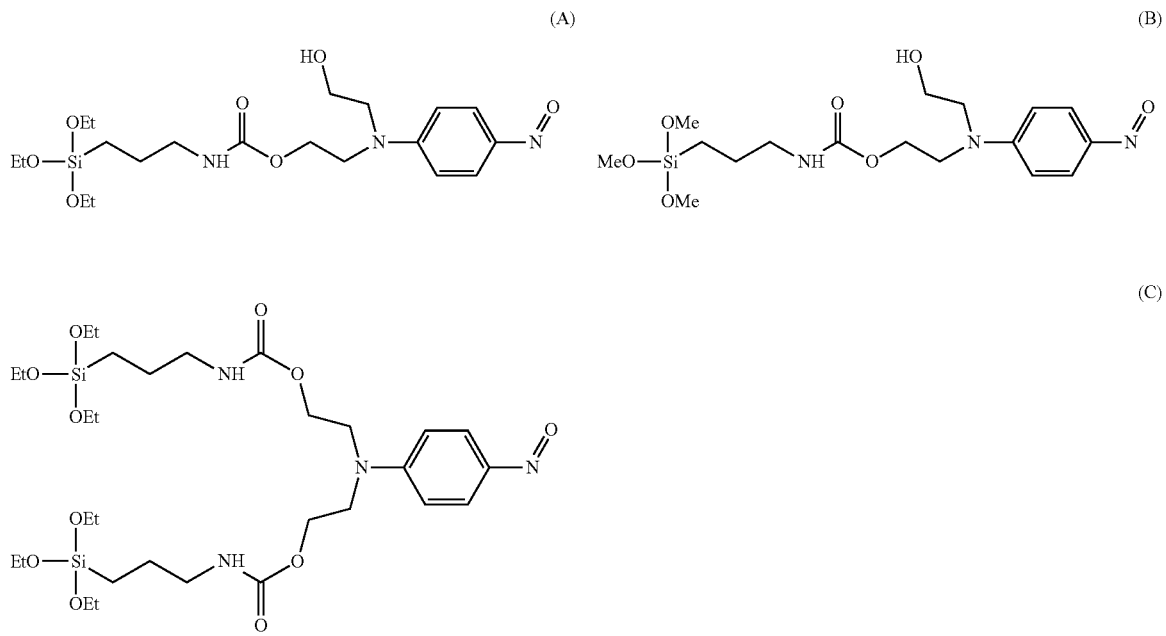

(D)
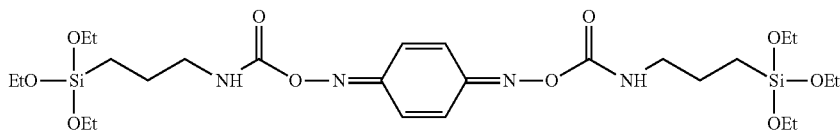

(E)
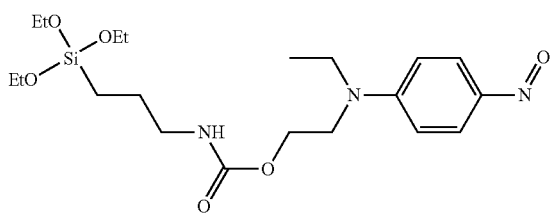

Desirably, the improved compositions of the present invention may comprise the following compound:

(E)
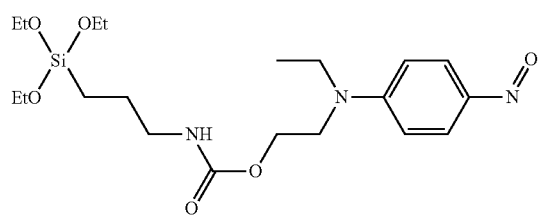

In the improved composition of the invention described above, the compound comprising the at least one alkoxy silane moiety and the at least one moiety selected from an aromatic nitroso or an aromatic nitroso precursor (also referred to as a nitrososilane) may be present in an amount of 1 to 20% w/w of the total composition. Suitably, the at least one aromatic nitroso compound precursor may be present in an amount of 1 to 15% w/w, for example, from 4 to 12% w/w. Desirably, the at least one aromatic nitroso compound precursor may be present in 6% w/w of the total composition.

It will be appreciated by a person skilled in the art that the various improved curable compositions of the present invention may additionally comprise conventional additives such as fillers, pigments, stabilisers, and moisture scavengers, provided that the additives do not interfere with effective curing of the compositions. The composition may comprise regular carbon blacks, which are not sulfur impregnated. Such carbon blacks may be acidic or basic. These include reinforcing carbon blacks; inactive fillers such as calcium carbonates, chalks, talcs, or metal oxides; accelerator systems; vulcanization retarders; promoters such as zinc oxide or stearic acid; plasticizers such as aromatic, paraffinic, naphthenic and synthetic mineral oils; ageing, light-protecting ozone-protecting, fatigue, coloration, and processing auxiliaries; and sulfur. Commonly these additives may be present at a quantity of about 0.1 parts to about 80 parts per 100 parts by weight of the rubber composition.

The composition may comprise silica.

Suitably, certain improved compositions of the present invention may comprise additional silanes. Suitably silane compounds and composition comprising same (but without the film formers of the present invention) are disclosed in International publication WO 2011/029752, the contents of which are incorporated herein by reference. Exemplary silanes may be of the general formula:

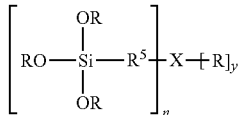

where:
n is either 1 or 2;
y=(2−n)
each $R^1$ can be selected from $C_1$-$C_{24}$ alkyl or $C_2$-$C_{24}$ acyl;
each $R^2$ can be selected from $C_1$-$C_{30}$ aliphatic groups, or substituted or unsubstituted $C_6$-$C_{30}$ aromatic groups;
$R^5$ can be selected from hydrogen, $C_1$-$C_{10}$ alkylene, $C_1$-$C_{10}$ alkylene substituted with one or more amino groups, $C_2$-$C_{10}$ alkenylene substituted with one or more amino groups, $C_6$-$C_{10}$ arylene, or $C_7$-$C_{20}$ alkarlyene;
X—$R^5$ is optional and X is either:

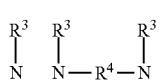

where each $R^3$ can be selected from hydrogen, $C_1$-$C_{30}$ aliphatic groups, or $C_6$-$C_{30}$ aromatic groups; and
$R^4$ can be selected from $C_1$-$C_{30}$ aliphatic groups, or $C_6$-$C_{30}$ aromatic groups; and
where when n=1, at least one of $R^3$ and $R^5$ is not hydrogen.

In one embodiment, X—$R^5$ is present. $R^1$ can be selected from $C_1$-$C_{24}$ alkyl, $R^2$ can be selected from $C_1$-$C_{30}$ aliphatic groups, X can be N—$R^3$ and $R^5$ can be selected from hydrogen or $C_1$-$C_{10}$ alkylene. As will be appreciated, when X—$R^5$ is absent the silane may be of the general formula (wherein $R_1$ and $R_2$ are as defined above):

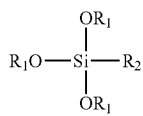

Preferred silanes include bis-silyl silanes such as those having two trisubstituted silyl groups. The substituents may be individually chosen from $C_1$-$C_{20}$ alkoxy, $C_6$-$C_{30}$ aryloxy and $C_2$-$C_{30}$ acyloxy. Suitable bis-silyl silanes for use in the improved compositions of the invention include:

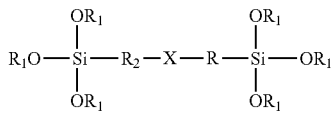

where:
each $R^1$ can be selected from $C_1$-$C_{24}$ alkyl or $C_2$-$C_{24}$ acyl;
each $R^2$ can be selected from $C_1$-$C_{20}$ aliphatic groups or $C_6$-$C_{30}$ aromatic groups;
X is optional and is either:

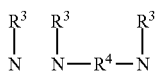

where each $R^3$ can be selected from hydrogen, $C_1$-$C_{20}$ aliphatic groups, or $C_6$-$C_{30}$ aromatic groups; and
$R^4$ can be selected from $C_1$-$C_{20}$ aliphatic groups or $C_6$-$C_{30}$ aromatic groups.

In one embodiment, X is present. $R^1$ can be selected from $C_1$-$C_{24}$ alkyl, $R^2$ can be selected from $C_1$-$C_{30}$ aliphatic groups, and X can be N— $R^3$. As will be appreciated, when X is absent the bis-silane may be of the general formula (wherein $R^1$ and $R^2$ are as defined above):

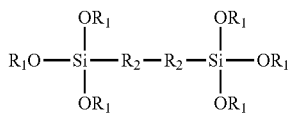

Examples of some bis-silyl aminosilanes used in the improved composition of the invention include: bis-(trimethoxysilylpropyl)amine, bis-(triethoxysilylpropyl) amine, bis-(triethoxysilylpropyl) ethylene diamine, N-[2-(vinylbenzylamino)ethyl]-3-aminopropyltrimethoxy silane, and aminoethyl-aminopropyltrimethoxy silane.

Such silanes may be included in the range from 1:3 to 3:1 relative to the nitrososilane compounds (stoichiometrically). As understood in the art, such mixing of silanes and nitrososilanes can result in excellent bonding to rubber substrates.

The silane may be present in an amount of 1 to 10% w/w of the total composition. Suitably, the silane may be present in an amount of 1 to 5% w/w, for example 1 to 3% w/w. The silane may be present in about 3% w/w of the total composition.

In particular, the inclusion of the amino bis(propyltrimethoxysilane) in addition to the nitrososilane significantly enhances the bond strength to rubber. It is thought that the amino bis(propyltrimethoxysilane) has multiple functions within the formulation. This includes aiding the film forming and "wetting" of the metal surface.

Generally, the final solution applied to the target substrate may vary in the total silane concentration and ratio (silane to nitrososilane) over a wide range and still provide beneficial results. The final solution should contain a total silane concentration of at least approximately 0.1% by volume, i.e., the concentration of the combination of silanes and nitrososilanes in the final solution. Solutions having a total silane concentration of between about 0.1% and about 10% by volume generally provide strong bonding without waste of valuable silanes.

Desirably, in an embodiment, in addition to the above described film former, the composition of the invention may further comprise a compound comprising:
(a) at least one phosphonate moiety; or
(b) at least one phosphinate moiety; and
(c) at least one moiety selected from an aromatic nitroso or an aromatic nitroso precursor and combinations thereof, as defined above.

Examples of these phorphorus compounds and composition comprising same (but without the film former of the invention) may be found in International publication WO 2011/032998, the contents of which are incorporated herein by reference. During curing, in the reaction of the nitroso group and the phosphonate/phosphinate, the nitroso may react with allylic functionality within a natural rubber while the phosphonate/phosphinate forms a bond with the second substrate, such as a hydroxylated surface or metal.

Suitably, the phosphonate moiety may be of the structure:

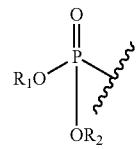

where $R_1$ and $R_2$ are the same or different and are selected from H, $C_1$-$C_{24}$ alkyl, and $C_3$-$C_{24}$ acyl.
$R_1$ and $R_2$ may be the same or different and may be selected from $C_1$-$C_4$ alkyl.

Suitably, the phosphinate moiety may be of the structure:

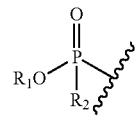

where $R_1$ is selected from H, $C_1$-$C_{24}$ alkyl, and $C_3$-$C_{24}$ acyl; and
$R_2$ is selected from $C_1$-$C_{24}$ alkyl, and $C_3$-$C_{24}$ acyl; and
$R_1$ and $R_2$ may be selected from $C_1$-$C_4$ alkyl.

In each of the above structures the squiggle indicates attachment to a moiety comprising an aromatic nitroso, an aromatic nitroso precursor or combinations thereof, as defined above.

Suitably, a compound for use in the improved composition of the invention may be of the general structure:

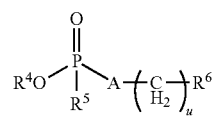

wherein u is from 0 to 20; A is a direct bond, O, or S; $R^4$ is selected from the group consisting of H, $C_1$-$C_{24}$ alkyl, and $C_3$-$C_4$ acyl, preferably from $C_1$-$C_4$ alkyl; $R^5$ is selected from the group consisting of $C_1$-$C_{24}$ alkyl, $C_1$-$C_{24}$ alkoxyl and $C_3$-$C_{24}$ acyl; and $R^6$ is a moiety comprising nitrosobenzene, quinone oxime or quinone dioxime.

$R_1$, $R_2$ and $R_3$ can be the same or different and may be selected from $C_1$-$C_4$ alkyl. n may be 0 to 5. n may be 1 to 4. $R_4$ may be a moiety comprising nitrosobenzene, quinone dioxime or quinone oxime, as defined above. X may be C, O or N. X may be C or O. X may be C. X may be O.

Structures for $R_4$ above may be selected from (showing linkage through X):

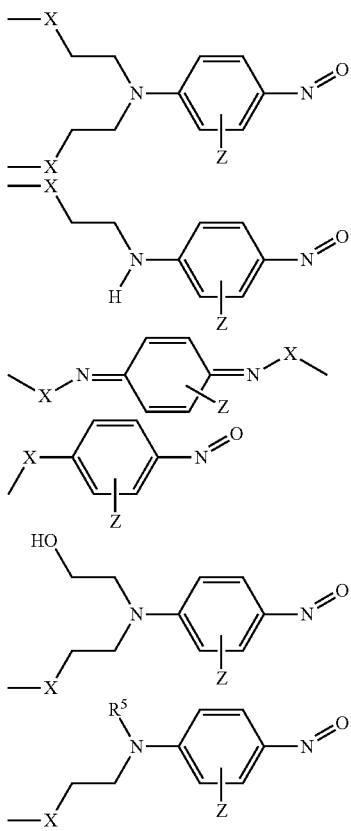

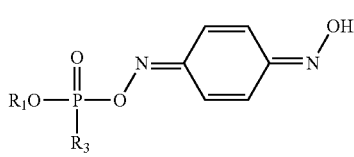

where $R_5$ can be $C_1$ to $C_{10}$ alkyl; and

Z indicates that the rings of the above structures can optionally be substituting mono-, di-, tri- or tetrasubstituted with the group consisting of $C_1$-$C_{20}$ alkyl, $C_3$-$C_{20}$ cycloalkyl, $C_1$-$C_{20}$ alkoxy, $C_7$-$C_{20}$ aralkyl, $C_7$-$C_{20}$ alkaryl, $C_5$-$C_{20}$ arylamine, $C_5$-$C_{20}$ arylnitroso, amino, hydroxy, halogen and combinations thereof, and further wherein the substituents can either be the same or different on each carbon atom of the ring. Such substitutions may be possible provided there is no interference with effective bonding or curing of the compositions. For example, provided there is no interference with the generation of a nitrosobenzene compound in-situ.

In an improved composition a suitable compound may be of the general formula:

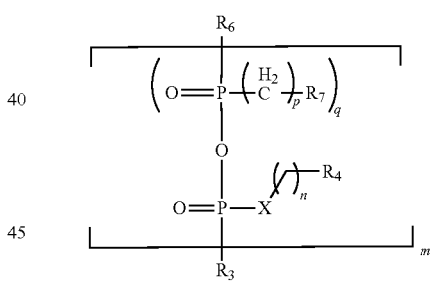

where $R_3$ can be $C_1$-$C_{24}$ alkyl, $C_3$-$C_{24}$ acyl or $OR_2$;
$R_1$ and $R_2$ can be the same or different and are selected from H, $C_1$-$C_{24}$ alkyl, and $C_3$-$C_{24}$ acyl.

$R_1$, $R_2$ and $R_3$ can be the same or different and may be selected from $C_1$-$C_4$ alkyl.

Further suitably compound may be of the following general structure;

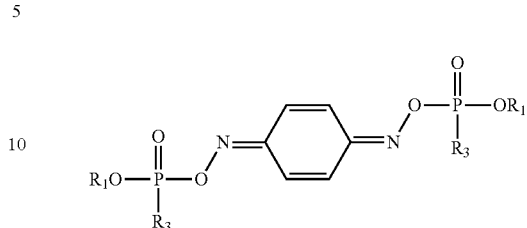

where $R_3$ can be $C_1$-$C_{24}$ alkyl, $C_3$-$C_{24}$ acyl or $OR_2$;
$R_1$ and $R_2$ can be the same or different and are selected from H, $C_1$-$C_{24}$ alkyl, and $C_3$-$C_{24}$ acyl.

$R_1$, $R_2$ and $R_3$ can be the same or different and may be selected from $C_1$-$C_4$ alkyl.

The invention provides for a polymer or co-polymer of a compound according to the present invention.

In another example of the invention, the improved composition of the invention may further comprise an oligomer or a co-oligomer comprising:
(a) at least one phosphonate moiety;
(b) at least one phosphinate moiety; and
(c) at least one moiety selected from an aromatic nitroso or an aromatic nitroso precursor and combinations thereof,
where a co-oligomeric compound is composed of different monomers.

The oligomer or a co-oligomer may have the following general structural formula:

$$\left[ \left( O=P\underset{O}{\overset{R_6}{|}}\left(\underset{}{\overset{H_2}{C}}\right)_p R_7 \right)_q \underset{\underset{R_3}{|}}{\overset{}{\underset{}{\overset{}{O=P-X}}}}\left(\phantom{X}\right)_n R_4 \right]_m$$

where m can be 1-100; n can be 0-20; p can be 1-10; q can be 0-50; and if q=0, m≥2;
$R_3$ and $R_6$ can be the same or different and may be selected from $C_1$-$C_{24}$ alkyl, $C_3$-$C_{24}$ acyl or $OR_2$;
$R_2$ can be selected from H, $C_1$-$C_{24}$ alkyl, and $C_3$-$C_{24}$ acyl; X can be C, O, N, or S;
$R_4$ may be a moiety comprising nitrosoaromatic, or a nitrosoaromatic precursor (defined above); and
$R_7$ can be selected from acrylate, aldehyde, amino, anhydride, azide, maleimide, carboxylate, sulfonate, epoxide, ester functional, halogens, hydroxyl, isocyanate or blocked isocyanate, sulfur functional, vinyl and olefin functional, or polymeric structures.

$R_2$, $R_3$ and $R_6$ can be the same or different and may be selected from $C_1$-$C_4$ alkyl. n may be 0 to 5. n may be 1 to 4. p may be 1 to 5. q may be 1 to 5. $R_4$ may be a moiety comprising nitrosobenzene, quinone dioxime or quinone oxime. X may be C, O or N. X may be C or O. X may be C. X may be O.

A preferred compound (also referred to as a nitrosophosphonate or a nitrosophosphinate) forming part of the improved composition of the invention may be present in an amount of 1 to 20% w/w of the total composition. Suitably, the compound may be present in an amount of 1 to 15% w/w, for example 4 to 12% w/w. The compound may be present in 6% w/w of the total composition.

The compound of the present invention may be substantially hydrolysed in the composition of the present invention. As described above, a carrier comprising water may allow for hydrolysis of the compound comprising the at least one phosphonate or phosphinate moiety.

As used herein hydrolysis of the compound refers to hydrolysis of an alkoxy (or acyloxy) group of the phosphonate or phosphinate moiety, i.e. hydrolysis of any alkoxy moiety to yield a hydroxy moiety. At least one alkoxy moiety in the compound may be hydrolysed to ensure good bonding. Advantageously, hydrolysis of the compound prior to bonding may result in improved adhesion. Hydrolysis of the compound prior to bonding may result in improved bond strengths. Hydrolysis of the compound prior to bonding may result in improved bond strengths in bonding a polymeric substrate having diene and or allylic functionality within the polymer chain to a metal or hydroxylated surface.

The provision of heat may aid in the hydrolysis of the phosphonate/phosphinate moiety of the compound of the present invention. The composition may be heated to a temperature between 30-100° C. Suitably, the composition may be heated to a temperature between 40-60° C. The composition may be heated to 50° C. The composition may be heated for between 1-2 hours. The composition may be heated for up to 2 hours. The composition may be applied directly to the target substrate. The composition may be cooled prior to application to the target substrate.

The step of substantially hydrolysing the compound of the present invention may comprise heating the composition to encourage hydrolysis of the phosphonate/phosphinate moiety of the compound of the present invention. The composition may be heated to a temperature between 30-100° C. Suitably, the composition may be heated to a temperature between 40-60° C. The composition may be heated to 50° C. The composition may be heated for between 1-2 hours. The composition may be heated for up to 2 hours. The composition may be applied directly to the target substrate. The composition may be cooled prior to application to the target substrate.

In bonding, the phosphinate/phosphonate moiety of the compound will anchor to the surface of the metal or the hydroxylated surface. The moiety selected from an aromatic nitroso or an aromatic nitroso precursor will generally become anchored to the polymer, for example a rubber material. Accordingly, each end of the molecule is functionalised and assists in bonding the materials together with a strong and durable bond.

Desirably, in an embodiment of the invention, in addition to the above described film former described above, the composition of the invention may further comprise a compound comprising:
 (a) at least one copper compound; and
 (b) at least one aromatic nitroso compound precursor.

The copper compound may oxidise the at least one aromatic nitroso compound precursor (defined above) to generate an aromatic nitroso compound in-situ.

As will be appreciated by a person skilled in the art, compositions of the present invention may further comprise adhesion promoting agents. The adhesion promoting agent may promote crosslinking between the aromatic nitroso compound and the elastomer substrate or may provide for improved adhesion to a substrate. For example, the adhesion promoting agent may be a silane, as defined above.

In the improved compositions of this embodiment of the present invention the oxidant is a copper compound. A general scheme for the oxidation of quinone dioxime to the dinitrosobenzene species using a copper oxidant is shown below, for information:

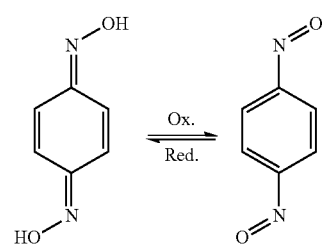 [SMILES: ON=C1C=CC(=NO)C=C1 ; O=Nc1ccc(N=O)cc1]

For example, the copper compound may be a Cu(I) or Cu(II) compound. The copper compound may be a Cu(O) compound which may oxidise in situ to a Cu(I) or Cu(II) compound. Suitable copper compounds are disclosed in International publication WO2010/106030, the contents of which are incorporated by reference. The copper compound may be metallic copper, copper salts, copper oxides or combinations thereof. Suitable copper compounds may be selected from the group consisting of copper nanopowder, CuO, $Cu_2O$, CuSCN, $Cu(SCN)_2$ and combinations thereof. The copper compound may be CuSCN, $Cu(SCN)_2$ or combinations thereof. The copper may be CuSCN. The oxidant may be copper thiocyanate. Accordingly, improved compositions suitable for bonding metal to rubber may be formulated, together with the film former as described above, utilising appropriate amounts of a copper oxidant according to the present invention.

The copper compound may be present in an amount of 1 to 20% w/w of the total composition. Suitably, the copper compound may be present in an amount of 1 to 10% w/w, for example 2 to 7% w/w. The copper compound may be present in 4% w/w.

Desirably, the copper compound (or oxidant) may be encapsulated.

The compositions of the present invention may further comprise a suitable carrier vehicle for the aromatic nitroso compound precursor and or copper salt.

Compositions comprising an aromatic nitroso compound precursor with a copper oxidant may also overcome the problems associated with the prior art discussed above. Furthermore, the compositions of the invention may be less toxic. This is particularly important prior to vulcanisation applications.

In a further aspect the present invention provides an improved curable composition, as described above, for bonding substrates together, the composition comprising:
 i) at least one compound according to the present invention as defined herein.

The improved composition of the present invention may further comprise:
 i) a suitable carrier vehicle for the compound.

As mentioned above, it will be appreciated that any suitable carrier vehicle may be utilised, for example, a solvent or solvent combination. It is particularly desirable that the carrier vehicle should be environmentally friendly.

Desirably, in an embodiment, in addition to the above described film former, the composition of the invention may comprise at least one encapsulated aromatic nitroso compound.

The invention further provides for an improved bonding composition comprising at least one encapsulated aromatic nitroso compound precursor.

In a further aspect, the invention provides for an improved bonding composition comprising at least one aromatic nitroso compound precursor and at least one oxidant for the aromatic nitroso compound precursor, wherein at least one of the precursor and the oxidant are encapsulated. The oxidant may be encapsulated. Alternatively, both the precursor and the oxidant may be encapsulated.

An encapsulated aromatic nitroso compound may be present in an amount of 1 to 20% w/w of the total composition. Suitably, the encapsulated aromatic nitroso compound may be present in an amount of 1 to 10% w/w, for example 1 to 6% w/w. The encapsulated aromatic nitroso compound may be present in 2% w/w of the total composition.

An encapsulated aromatic nitroso compound precursor may be present in an amount of 1 to 20% w/w of the total composition. Suitably, the encapsulated aromatic nitroso compound precursor may be present in an amount of 1 to 10% w/w, for example 1 to 6% w/w. The encapsulated aromatic nitroso compound precursor may be present in 2% w/w of the total composition.

A non-encapsulated aromatic nitroso compound precursor may be present in an amount of 1 to 20% w/w of the total composition. Suitably, the non-encapsulated aromatic nitroso compound precursor may be present in an amount of 1 to 10% w/w, for example 1 to 6% w/w. The non-encapsulated aromatic nitroso compound precursor may be present in 2% w/w of the total composition.

In the compositions of the present invention the oxidant may be a peroxide. For example, the oxidant may be benzoyl peroxide. The oxidant may also be a metal salt, for example a copper salt. Compositions suitable for bonding metal to rubber may be formulated utilising appropriate amounts of an encapsulated oxidant according to the present invention.

An encapsulated oxidant compound may be present in an amount of 1 to 20% w/w of the total composition. Suitably, the encapsulated oxidant may be present in an amount of 1 to 10% w/w, for example 3 to 8% w/w. The encapsulated oxidant may be present in 4% w/w. The encapsulated oxidant may be present in 8% w/w.

A non-encapsulated oxidant compound may be present in an amount of 1 to 20% w/w of the total composition. Suitably, the non-encapsulated oxidant may be present in an amount of 1 to 10% w/w, for example 3 to 8% w/w. The non-encapsulated oxidant may be present in 4% w/w. The non-encapsulated oxidant may be present in 8% w/w.

By encapsulating constituents, the compositions of the present invention eliminate the undesirable need to formulate compounds comprising free nitroso groups in improved curable composition compositions. Encapsulating the oxidant, the encapsulated aromatic nitroso compound precursor, or combinations thereof ensures that the nitroso group is only formed upon oxidation of the precursor during the vulcanisation process, which is the phase where bond formation takes place.

Desirably, the encapsulant in the compositions of the present invention comprises a stable capsule which will release the active core material upon rupturing via thermal or mechanical means. The encapsulated material may be one of an aromatic nitroso compound or an aromatic nitroso compound precursor. The encapsulated material may be an oxidising agent present in sufficient quantities to oxidise the aromatic nitroso compound precursor to an aromatic nitroso compound in-situ. The encapsulated material may be catalyst for enhancing the rate of reaction between a nitroso aromatic compound and a diene moiety or allylic moiety present in a polymer substrate, such as an elastomer.

The encapsulant material may be selected from the group consisting of hard, polymerised material, gelatin or resin. For example, suitable resins may comprise urea/formaldehyde resin. The capsules/encapsulant material should be structurally sound, the capsule should not react with the surrounding media, the encapsulated material should not leach through the encapsulant material, and the encapsulant material should be capable of encapsulating core materials that may otherwise spontaneously oxidise or which may be hygroscopic. The capsule walls must also be resistant to chemical attack by the materials contained therein. Suitable capsule/encapsulant materials may be chosen by those skilled in the art and conventional methods of making the capsules may be used.

The capsules/microcapsules may have an average diameter in the range 20-100 micrometres. Preferably, the microcapsules have walls rupturable under a load greater than about 1.0 kg/cm$^2$, preferably greater than 2.0 kg/cm$^2$. Suitably, the capsules will rupture under a load between 3 and 5 kg/cm$^2$.

The compositions of the present invention may further comprise a suitable carrier vehicle for one of the encapsulated aromatic nitroso compound, the (encapsulated) aromatic nitroso compound precursor, and/or the (encapsulated) oxidant.

The compositions of the present invention provide for elastomer to substrate bonding, for example elastomer to metal bonding. The compositions of the present invention comprise at least one encapsulated component, such as an encapsulated oxidant, an encapsulated aromatic nitroso compound precursor, or an encapsulated adhesion promoter to promote crosslinking of the nitrosoaromatic and dinitrosoaromatic materials with the elastomer. The present invention also provides for combinations of the above encapsulated materials.

In another aspect the composition of the invention may further comprise
  i) at least one a film former component comprising at least one non-halogenated hydroxy group-containing resin together with at least one crosslinking agent;
  ii) at least one epoxysilane having at least one terminal alkoxy silane group;
  iii) at least one bis-silane; and
  iv) optionally at least one organic solvent.

Examples of such compositions (but without the film former of the present invention) are provided in patent application number PCT/EP2011/056826, the contents of which are incorporated herein by reference.

The improved curing or improved curable composition of this embodiment of the present invention is preferably a one-part improved curable composition, which means, that one or more epoxysilanes and one or more bis-silanes are mixed with one or more halogenated polyolefins, prior to use.

The aforementioned components are preferably mixed in the presence of at least one organic solvent of the present invention as described above.

It is advantageous to formulate the improved curable composition of the present invention as a one-part system, because such systems are readily applied to substrates in a single step using conventional techniques, such as spraying, rolling or dipping.

The improved curable composition of the present invention is preferably storage-stable, which means that the improved curable composition formulation remains homogeneous, as determined by unenhanced visual inspection, when stored for a period of at least about 1 day at 22° C. in a sealed container.

The term "epoxysilane", as used herein, refers to a compound having at least one epoxy group and at least one terminal alkoxy silane group per molecule. Desirably, the epoxysilanes contemplated for use in the adhesive of the present invention are selected from compounds having a single epoxy group and a single terminal alkoxy silane group per molecule.

The term "terminal alkoxy silane group", as used herein, refers to a functional group at one end of the molecule, wherein said functional group comprises exactly one silicon atom, wherein at least one alkoxy residue is bound to the silicon atom of the terminal alkoxy silane group. It may be appreciated that the epoxysilane may also be bound to a carrier material, such as a silica carrier.

The improved curable composition of the present invention can comprise any mixture or combination of the aforementioned film former, suitably halogenated polyolefins. One or more halogenated polyolefins may be present in the inventive improved curable composition to provide adequate film properties in an amount in the range of 1 to 30 wt.-%, more preferably in an amount of 3 to 20 wt.-%, and particularly preferably in an amount of 7 to 15 wt.-%, each based on the total weight of the improved curable composition of the present invention.

If the halogenated polyolefin is selected from chlorinated polyolefins, it is preferred that the chlorinated polyolefin is present in an amount in the range of about 1 to about 30 percent by weight, more preferably in an amount of about 3 to about 20 percent by weight, and particularly preferably in an amount of about 7 to about 15 percent by weight, each based on the total weight of the improved curable composition of the present invention.

The improved curable composition of the present invention further comprises at least one epoxysilane having at least one terminal alkoxy silane group (hereinafter referred to as epoxysilane).

The use of epoxysilanes in the improved curable composition of the present invention is preferred, because the utilization of other epoxy resins, such as epoxy resins having no terminal alkoxy silane group, may lead to a significant decrease in the bonding performance of the resulting improved curable composition, especially in regard to heat aging and post-curing of the formed bond.

In one embodiment of the present invention the terminal alkoxy silane group of the epoxysilane is represented by formula

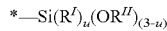

wherein u is 0, 1 or 2, each $R^I$ is independently selected from hydrogen, halogen, alkyl, cycloalkyl, alkenyl, aryl or acyl and each $R^{II}$ is independently selected from alkyl, cycloalkyl, alkenyl, aryl or acyl. In a particular preferred embodiment u is 0 and $R^{II}$ is selected from alkyl, wherein preferred alkyl groups include methyl, ethyl, n-propyl and iso-propyl.

Suitable terminal alkoxy silane groups include trimethoxysilane, triethoxysilane, tri-n-propoxysilane and/or tri-iso-propoxysilane groups.

To enhance the bonding properties of the improved curable composition of the present invention, it is advantageous that the epoxysilane, which is used in the improved curable composition of the present invention, is a non-polymeric compound, which means that the molecular weight of said epoxysilane is preferably less than 1000 g/mol, more preferably less than 750 g/mol, and particularly preferably less than 500 g/mol.

The epoxysilane contemplated for use in the practice of the present invention may be a monosilane. The term "monosilane", as used herein, refers to silane compounds having exactly one silicon atom per molecule, wherein monosilanes are preferred where three alkoxy residues are bound to the silicon atom.

Suitable epoxysilanes may be represented by formula (I),

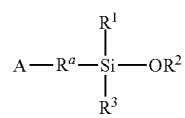

formula (I)

wherein $R^a$ is a divalent linkage group, comprising 1 to 24, preferably 2 to 20 and more preferably 3 to 10 carbon atoms, $R^1$ and $R^3$ independently of one another are selected from $C_{1-24}$ alkyl, such as $C_{1-5}$ alkyl, $C_{2-24}$ alkenyl, $C_{1-24}$ alkoxyl or $C_{3-24}$ acyl, and $R^2$ is selected from $C_{1-24}$ alkyl, such as $C_{1-5}$ alkyl or $C_{3-24}$ acyl, and A is either

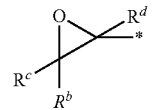

where $R^b$, $R^c$ and $R^d$ independently of one another are hydrogen or $C_{1-6}$ alkyl; or

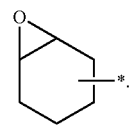

Desirably $R^b$, $R^c$ and $R^d$ are hydrogen.

The divalent linkage group $R^a$ can be a straight or branched alkylene group of 1 to 24, preferably of 2 to 20 and more preferably of 3 to 10 carbon atoms. Said alkylene group may be interrupted by at least one heteroatom, preferably selected from oxygen, sulfur or nitrogen.

It is further on preferred that $R^1$ and $R^3$ of formula (I) independently of one another are selected from $C_{1-5}$ alkoxyl, such as methoxy, ethoxy, n-propoxy or iso-propoxy, and/or $R^2$ of formula (I) is $C_{1-5}$ alkyl, such methyl, ethyl, n-propyl or iso-propyl. More preferably $R^1$ and $R^3$ of formula (I) are both selected from methoxy, ethoxy, n-propoxy or iso-propoxy and $R^2$ of formula (I) is methyl, ethyl, n-propyl or iso-propyl.

Particularly preferred epoxysilanes are represented by formula (II),

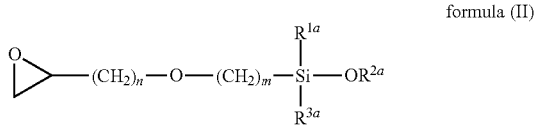

formula (II)

wherein n is an integer from 1 to 10, m is an integer from 0 to 14, $R^{1a}$ and $R^{3a}$ independently of one another are selected from $C_{1-24}$ alkyl, such as $C_{1-5}$ alkyl, $C_{2-24}$ alkenyl, $C_{1-24}$ alkoxyl or $C_{3-24}$ acyl, and $R^{2a}$ is selected from $C_{1-24}$ alkyl, such as $C_{1-5}$ alkyl or $C_{3-24}$ acyl. Desirably, n is 1, 2 or 3 and/or m is 2, 3 or 4, wherein it is particularly preferred that n is 1 and m is 3.

It is further on preferred that $R^{1a}$ and $R^{3a}$ of formula (II) independently of one another are selected from $C_{1-5}$ alkoxyl, such as methoxy, ethoxy, n-propoxy or iso-propoxy, and/or $R^{2a}$ of formula (II) is $C_{1-5}$ alkyl, such methyl, ethyl, n-propyl or iso-propyl. More preferably $R^{1a}$ and $R^{3a}$ of formula (II) are both selected from methoxy, ethoxy, n-propoxy or iso-propoxy and $R^{2'}$ of formulae (II) is methyl, ethyl, n-propyl or iso-propyl.

Other particularly preferred epoxysilane contemplated for use in the practice of the present invention are represented by formula (IIa),

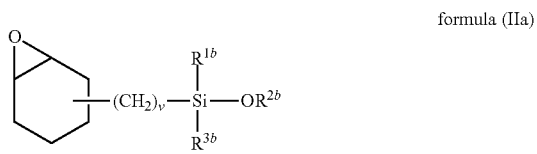

formula (IIa)

wherein v is an integer from 1 to 10, $R^{1b}$ and $R^{3b}$ independently of one another are selected from $C_{1-24}$ alkyl, such as $C_{1-5}$ alkyl, $C_{2-24}$ alkenyl, $C_{1-24}$ alkoxyl, such as $C_{1-5}$ alkoxyl or $C_{3-24}$ acyl, and $R^{2b}$ is selected from $C_{1-24}$ alkyl, such as or $C_{3-24}$ acyl. Desirably, v is 1, 2 or 3.

It is further on preferred that $R^{1b}$ and $R^{3b}$ of formula (IIa) independently of one another are selected from $C_{1-5}$ alkoxyl, such as methoxy, ethoxy, n-propoxy or iso-propoxy, and/or $R^{2b}$ of formula (IIa) is $C_{1-5}$ alkyl, such methyl, ethyl, n-propyl or iso-propyl. More preferably $R^{1b}$ and $R^{3b}$ of formula (IIa) are both selected from methoxy, ethoxy, n-propoxy or iso-propoxy and $R^{2''}$ of formulae (IIa) is methyl, ethyl, n-propyl or iso-propyl.

In one embodiment of the present invention the epoxysilane is selected from 3-glycidyloxypropyltrimethoxysilane (GLYMO), 3-glycidyloxypropyltriethoxysilane (GLYEO), 3-glycidyloxypropyltri-n-propoxysilane, 3-glycidyloxypropyltri-iso-propoxysilane, 3-glycidyloxypropyltri-n-butoxysilane, 3-glycidyloxypropyltri-iso-butoxysilane, beta-(3,4-epoxycyclohexyl)-ethyltrimethoxysilane, beta-(3,4-epoxycyclohexyl)-ethyltriethoxysilane, beta-(3,4-epoxycyclohexyl)-ethyltri-n-propoxysilane, beta-(3,4-epoxycyclohexyl)-ethyltri-iso-propoxysilane, gamma-(3,4-epoxycyclohexyl)-propyltrimethoxysilane, gamma-(3,4-epoxycyclohexyl)-propyltriethoxysilane, gamma-(3,4-epoxycyclohexyl)-propyltri-n-propoxysilane, gamma-(3,4-epoxycyclohexyl)-propyltri-iso-propoxysilane and/or combinations thereof.

The aforementioned epoxysilanes are known in the art and are commercially available from various companies, including Evonik Industries AG, Wacker Chemie AG, Shin-Etsu Chemical and Gelest Inc.

A single epoxysilane or a mixture of two or more epoxysilanes can be used in the improved curable composition of the present invention.

To ensure sufficient adhesion to the substrate, especially to metal substrates, it is desirable that one or more epoxysilanes are present in an amount of 0.2 to 5 wt.-%, preferably in an amount of 0.5 to 2 wt.-%, and more preferably in an amount of 0.75 to 1.25 wt.-%, each based on the total amount of the improved curable composition of the present invention.

The improved curable composition of the present invention further comprises at least one bis-silane. The term "bis-silane", as used herein, refers to silane compounds having exactly two silicon atoms per molecule, wherein the two silicon atoms are linked with each other by a divalent linkage group and each silicon atom carries three additional substituents, wherein at least one of the three additional substituents is an alkyl or alkoxy residue. Consequently, the bis-silane used in the improved curable composition of the present invention comprises two terminal organo-silyl groups. Under the proviso that the bis-silane contemplated for use in the improved curable composition of the present invention comprises at least one terminal alkoxy silane group, as defined above, said bis-silane does not comprise at least one epoxy group.

In one embodiment of the present invention the terminal organo-silyl group of the bis-silane is represented by formula $$*-Si(R^{III})_w(OR^{IV})_{(3-w)}$$

wherein w is 0, 1, 2 or 3, preferably w is 3, each $R^{III}$ is independently selected from hydrogen, halogen, alkyl, cycloalkyl, alkenyl, aryl or acyl and each $R^{IV}$ is independently selected from alkyl, cycloalkyl, alkenyl, aryl or acyl. In a particular preferred embodiment w is 0 and $R^{IV}$ is selected from alkyl, wherein preferred alkyl groups include methyl, ethyl, n-propyl and iso-propyl.

To enhance the bonding properties of the improved curable composition of the present invention, it is advantageous that the bis-silane, which is used in the improved curable composition of the present invention, is a non-polymeric compound, which means that the molecular weight of said bis-silane is preferably less than 1000 g/mol, more preferably less than 750 g/mol, and particularly preferably less than 500 g/mol.

Suitable bis-silanes contemplated for use in the improved curable composition of the present invention may be represented by formula (III),

formula (III)

wherein p is 0 to 3, q is 0 to 3, B represents a divalent linkage group comprising 1 to 24 carbon atoms and at least one heteroatom selected from N, S or O, each $R^4$ and each $R^6$ is independently selected from hydrogen, halogen, $C_{1-24}$ alkyl, $C_{2-24}$ alkenyl, $C_{1-24}$ alkoxyl or $C_{3-24}$ acyl, and each $R^5$ and each $R^7$ is independently selected $C_{1-24}$ alkyl or $C_{3}$-24 acyl.

Particular good bonding and drying properties are achieved, when the divalent linkage group B of formula (III) comprises one of the following structural elements:

where $R^8$ is selected from hydrogen, $C_{1-24}$ alkyl, such as $C_{1-4}$ alkyl, or $C_{6-18}$ aryl;

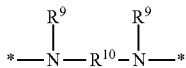

where each $R^9$ is independently selected from hydrogen, $C_{1-24}$ alkyl, such as $C_{1-4}$ alkyl, or $C_{6-18}$ aryl and $R^{10}$ is selected from $C_{1-24}$ alkylene or $C_{6-18}$ arylene; or

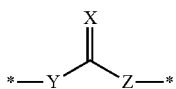

where Y is selected from O, S, and —$NR^{11}$—, Z is selected from O, S, and —$NR^{12}$—, wherein $R^{11}$ and $R^{12}$ independently of one another are selected from hydrogen or $C_{1-24}$ alkyl, such as $C_{1-4}$ alkyl, or $C_{6-18}$ aryl; X is the selected from O or S, with the proviso that Y and Z are not both O or S. Preferably Y is NH, Z is NH and X is O.

In an alternative embodiment the divalent linkage group B of formula (III) comprises the following structural element:

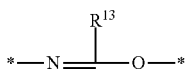

where $R^{13}$ is selected from $C_{1-24}$ alkyl, such as $C_{1-4}$ alkyl.

Preferred bis-silanes include those having two trisubstituted silyl groups. The substituents may individually be chosen from $C_{1-24}$ alkoxy, $C_{6-18}$ aryloxy and $C_{2-24}$ acyloxy.

Suitable bis-silanes for use within the present invention include those of formula (IV), $$(R^{15}O)_3Si—(R^{14})_k—D—(R^{14})_k—Si(OR^{15})_3 \quad \text{formula (IV)}$$

where k is 0 or 1, each $R^{15}$ is independently selected from $C_{1-4}$ alkyl or $C_{1-4}$ acyl and each $R^{14}$ is independently selected from $C_{1-6}$ alkylene or $C_{6-12}$ arylene, and D is selected from one of the following divalent groups:

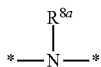

where $R^{8a}$ is selected from hydrogen, $C_{1-24}$ alkyl, such as $C_{1-4}$ alkyl, or $C_{6-18}$ aryl;

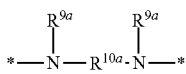

where each $R^{9a}$ is independently selected from hydrogen, $C_{1-24}$ alkyl, such as $C_{1-4}$ alkyl, or $C_{6-18}$ aryl and $R^{10a}$ is selected from $C_{1-24}$ alkylene or $C_{6-18}$ arylene;

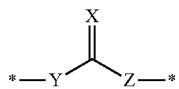

where Y is selected from O, S, and —$NR^{11a}$—, Z is selected from O, S, and —$NR^{12a}$—, wherein $R^{11a}$ and $R^{12a}$ independently of one another are selected from hydrogen or $C_{1-24}$ alkyl, or $C_{6-18}$ aryl, and X is the selected from O or S, with the proviso that Y and Z are not both O or S. Preferably Y is NH, Z is NH and X is O.

Examples of suitable bis-silanes for use within the improved curable composition of the present invention include:

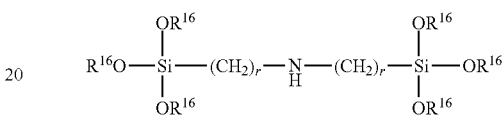

where r is from 1 to 10, such as from 1 to 4 and $R^{16}$ is selected from $C_{1-4}$ alkyl or $C_{1-4}$ acyl, and/or

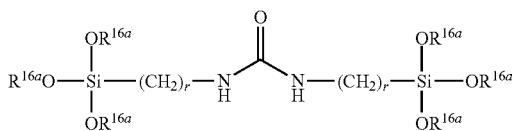

where r is from 1 to 10, such as from 1 to 4 and $R^{16a}$ is selected from $C_{1-4}$ alkyl or $C_{1-4}$ acyl.

In one embodiment of the present invention the bis-silane is selected from bis-(trimethoxysilylethyl)amine, bis-(triethoxysilylethyl)amine, bis-(tri-n-propoxysilylethyl)amine, bis-(tri-iso-propoxysilylethyl)amine, bis-(trimethoxysilylpropyl)amine, bis-(triethoxysilylpropyl)amine, bis-(tri-n-propoxysilylpropyl)amine, bis-(tri-iso-propoxysilylpropyl)amine, bis-(trimethoxysilylethyl)urea, bis-(triethoxysilylethyl) urea, bis-(tri-n-propoxysilylethyl) urea, bis-(tri-iso-propoxysilylethyl)urea, bis-(trimethoxysilylpropyl)urea, bis-(triethoxysilylpropyl)urea, bis-(tri-n-propoxysilylpropyl)urea, bis-(tri-iso-propoxysilylpropyl) urea, and/or combinations thereof. Preferably, bis-(trimethoxysilylpropyl)urea and/or bis-(trimethoxysilylpropyl)amine are used in the present invention, although other bis-silanes may also be used.

Other desirable bis-silanes include N,O-bis(trimethylsilyl)acetamide N,O-bis(triethylsilyl)acetamide, 1,3-bis(trimethylsilyl)urea, 1,3-bis(triethylsilyl)urea, 1,3-bis(trimethylsilyl)thiourea, 1,3-bis(triethylsilyl)thiourea, and/or mixtures thereof.

The aforementioned bis-silanes are known in the art and are commercially available form various companies, including Evonik Industries AG, Wacker Chemie AG, Shin-Etsu Chemical and Gelest Inc.

A single bis-silane or a mixture of two or more bis-silanes can be used in the improved curable composition of the present invention.

It is desirable that one or more bis-silanes are present in an amount of 0.1 to 2 wt.-%, preferably in an amount of 0.15 to 1 wt.-%, and more preferably in an amount of 0.2 to 0.4 wt.-%, each based on the total amount of the of improved curable composition of the present invention.

By using a combination of the aforementioned halogenated polyolefins, epoxysilanes and bis-silanes in the improved curable composition of the present invention the elastomer-to-metal bonding properties of the inventive improved curable composition are significantly improved over comparable improved curable composition formulation of the prior art, which do not comprise such a synergistic combination. In addition, the coating properties of the improved curable composition of the present invention are improved over comparable prior art adhesive composition formulations of the prior art. Conventional curable compositions normally require a drying time at elevated temperatures after being applied to substrates, such as metallic substrates. In contrast to that, the improved curable composition of the present invention can be dried at 22° C. in short time periods and the resulting coating is hard and non-tacky. Therefore, it is possible to pre-coat and store different substrates, such as metallic substrates and to directly use these pre-coated substrates later on in bonding operations.

The improved curable composition of the present invention may advantageously comprise one or more of the aforementioned epoxysilanes in an amount of 0.2 to 5 wt.-%, preferably in an amount of 0.5 to 2 wt.-%, and particularly preferably in an amount of 0.75 to 1.25 wt.-% and one or more of the aforementioned bis-silanes in an amount of 0.1 to 2 wt.-%, preferably in an amount of 0.15 to 1 wt.-%, and particularly preferably in an amount of 0.2 to 0.4 wt.-%, wherein each amount is based on the total amount of the improved curable composition of the present invention.

A particular durable elastomer to metal bond is formed by the cured product of the improved curable composition of the present invention, when said improved curable composition comprises the epoxysilane and the bis-silane in a weight ratio of 1:0.2 to 1:0.8, preferably in a weight ration of 1:0.3 to 1:0.7.

The weight ratio of epoxysilane to the bis-silane, as used herein, refers to weight ratio of the total amount of all epoxysilanes to the total amount of all bis-silanes present in the improved curable composition of the present invention.

The bonding performance of the improved curable composition of the present invention can further be improved by using the following combinations of epoxysilanes and bis-silanes:
3-glycidyloxypropyltrimethoxysilane and bis-(trimethoxysilylpropyl)amine;
3-glycidyloxypropyltrimethoxysilane and bis-(trimethoxysilylpropyl)urea;
3-glycidyloxypropyltriethoxysilane and bis-(trimethoxysilylpropyl)amine;
3-glycidyloxypropyltriethoxysilane and bis-(trimethoxysilylpropyl)urea;
3-glycidyloxypropyltri-n-propoxysilane and bis-(trimethoxysilylpropyl)amine;
3-glycidyloxypropyltri-n-propoxysilane and bis-(trimethoxysilylpropyl)urea;
3-glycidyloxypropyltri-iso-propoxysilane and bis-(trimethoxysilylpropyl)amine;
3-glycidyloxypropyltri-iso-propoxysilane and bis-(trimethoxysilylpropyl)urea.

Particularly good bonding performances are achieved when the following combinations of epoxysilanes and bis-silanes are used in the amounts given, wherein each amount is based on the total amount of the improved curable composition of the present invention:
from 0.5 to 2 wt.-% of 3-glycidyloxypropyltrimethoxysilane and from 0.15 to 1 wt.-% of bis-(trimethoxysilylpropyl)amine;
from 0.5 to 2 wt.-% of 3-glycidyloxypropyltrimethoxysilane and from 0.15 to 1 wt.-% of bis-(trimethoxysilylpropyl)urea;
from 0.5 to 2 wt.-% of 3-glycidyloxypropyltriethoxysilane and from 0.15 to 1 wt.-% of bis-(trimethoxysilylpropyl)amine;
from 0.5 to 2 wt.-% of 3-glycidyloxypropyltriethoxysilane and from 0.15 to 1 wt.-% of bis-(trimethoxysilylpropyl)urea;
from 0.5 to 2 wt.-% of 3-glycidyloxypropyltri-n-propoxysilane and from 0.15 to 1 wt.-% of bis-(trimethoxysilylpropyl)amine;
from 0.5 to 2 wt.-% of 3-glycidyloxypropyltri-n-propoxysilane and from 0.15 to 1 wt-% of bis-(trimethoxysilylpropyl)urea;
from 0.5 to 2 wt.-% of 3-glycidyloxypropyltri-iso-propoxysilane and from 0.15 to 1 wt.-% of bis-(trimethoxysilylpropyl)amine;
from 0.5 to 2 wt.-% of 3-glycidyloxypropyltri-iso-propoxysilane and from 0.15 to 1 wt.-% of bis-(trimethoxysilylpropyl)urea.

The epoxysilane and the bis-silane used in the present invention are preferably free and mobile components of the improved curable composition of the present invention, which means that said silane compounds are not immobilized on a carrier material, such as a solid surface.

However, it may be desirable for specific applications that the epoxysilane and/or the bis-silane used in the present invention is/are immobilized on a carrier material, such as a solid surface.

The improved curable compositions of the present invention can be prepared by conventional means. For ease of application, the components of the inventive of the improved curable composition can be dispersed or dissolved in a liquid carrier, such as an organic solvent or a mixture of different organic solvents. Once the improved curable composition has been applied the liquid carrier evaporates.

In one embodiment the improved curable composition of the present invention comprises at least one organic solvent as a liquid carrier. The organic solvent may comprise water or water-miscible solvents, wherein it is preferred that the amount of water in the organic solvent is less than 10 wt.-%, preferably less than 5 wt.-%, more preferably less than 1 wt.-%, and particularly preferably less than 0.1 wt.-%, each based on the total amount of the organic solvent.

Depending on the amount of water present in the organic solvent, it is possible that the epoxysilane and/or the bis-silane used in the present invention are partially or fully hydrolyzed.

Examples of suitable organic solvents include aromatic and halogenated aromatic hydrocarbons such as benzene, toluene, xylene, chlorobenzene, and dichlorobenzene; halogenated aliphatic hydrocarbons such as trichloroethylene, perchloroethylene, and propylene dichloride; ketones such as methyl ethyl ketone, and methyl isobutyl ketone; ethers, naphthas, etc., including mixtures of such solvents.

Preferred organic solvents are xylene and toluene, ortho- and para-chlorotoluene, optionally in combination with tetrachloroethylene.

The improved curable composition of the present invention can comprise any mixture of the aforementioned organic solvents, wherein mixtures of at least one aromatic solvent and at least one non-aromatic solvent are preferred to ensure that a dry and non-tacky film is formed. The amount of organic solvent employed is preferably in the range of about 50 to about 90 percent by weight, more preferably in the range of about 60 to about 80 percent by weight, and particularly preferably in the range of about 65 to about 75 percent by weight, each based on the total amount of the inventive improved curable composition.

The improved curable compositions of the present invention may additionally comprise any additives conventionally used in improved curable composition formulation that are suitable for use in polymer-to-metal, for example elastomer to metal such as rubber to metal bonding applications.

Illustrative examples of such additives include reinforcing carbon blacks; fillers such as calcium carbonates, chalks, talcs, silicas or metal oxides; accelerator systems; vulcanization retarders; promoters such as zinc oxide or stearic acid; plasticizers such as aromatic, paraffinic, naphthenic and synthetic mineral oils; light-protecting agents; ozone-protecting agents; processing auxiliaries, sulfur and/or any combination thereof.

Commonly these additives may be present at a quantity of about 0.1 to about 80 percent by weight, more preferably at a quantity of about 0.1 to about 40 percent by weight, each based on the total amount of the improved curable composition of the present invention.

One typical formulation of the improved curable composition of the present invention comprises or consists of, based on the total amount of the improved curable composition:
  i) from 1 to 30 wt.-% of at least one halogenated polyolefin;
  ii) from 0.2 to 5 wt.-% of at least one epoxysilane having at least one terminal alkoxy silane group;
  iii) from 0.1 to 2 wt.-% of at least one bis-silane; and
  iv) from 40 to 90 wt.-% of at least one organic solvent;
  v) from 0 to 50 wt.-% of at least one additive.

Another typical formulation of the improved curable composition of the present invention comprises or consists of, based on the total amount of the improved curable composition:
  i) from 1 to 30 wt.-% of at least one chlorinated polyolefin;
  ii) from 0.2 to 5 wt.-% of at least one epoxysilane having at least one terminal alkoxy silane group selected from the group consisting of 3-glycidyloxypropyltrimethoxysilane, 3-glycidyloxypropyltriethoxysilane, 3-glycidyloxypropyltri-n-propoxysilane, 3-glycidyloxypropyltri-iso-propoxysilane, 3-glycidyloxypropyltri-n-butoxysilane, 3-glycidyloxypropyltri-iso-butoxysilane, beta-(3,4-epoxycyclohexyl)-ethyltrimethoxysilane, beta-(3,4-epoxycyclohexyl)-ethyltriethoxysilane, beta-(3,4-epoxycyclohexyl)-ethyltri-n-propoxysilane, beta-(3,4-epoxycyclohexyl)-ethyltri-iso-propoxysilane, gamma-(3,4-epoxycyclohexyl)-propyltrimethoxysilane, gamma-(3,4-epoxycyclohexyl)-propyltriethoxysilane, gamma-(3,4-epoxycyclohexyl)-propyltri-n-propoxysilane, and gamma-(3,4-epoxycyclohexyl)-propyltri-iso-propoxysilane;
  iii) from 0.1 to 2 wt.-% of at least one bis-silane; and
  iv) from 40 to 90 wt.-% of at least one organic solvent;
  v) from 0 to 50 wt.-% of at least one additive.

A further typical formulation of the improved curable composition of the of the present invention comprises or consists of, based on the total amount of the improved curable composition:
  i) from 1 to 30 wt-% of at least one chlorinated polyolefin;
  ii) from 0.2 to 5 wt.-% of at least one epoxysilane having at least one terminal alkoxy silane group;
  iii) from 0.1 to 2 wt.-% of at least one bis-silane selected from the group consisting of bis-(trimethoxysilylethyl)amine, bis-(triethoxysilylethyl)amine, bis-(tri-n-propoxysilylethyl)amine, bis-(tri-iso-propoxysilylethyl)amine, bis-(trimethoxysilylpropyl)amine, bis-(triethoxysilylpropyl)amine, bis-(tri-n-propoxysilylpropyl)amine, bis-(tri-iso-propoxysilylpropyl)amine, bis-(trimethoxysilylethyl)urea, bis-(triethoxysilylethyl)urea, bis-(tri-n-propoxysilylethyl) urea, bis-(tri-iso-propoxysilylethyl) urea, bis-(trimethoxysilylpropyl)urea, bis-(triethoxysilylpropyl)urea, bis-(tri-n-propoxysilylpropyl)urea, and bis-(tri-iso-propoxysilylpropyl) urea;
  iv) from 40 to 90 wt.-% of at least one organic solvent;
  v) from 0 to 50 wt.-% of at least one additive.

Another typical formulation of the improved curable composition of the present invention comprises or consists of, based on the total amount of the improved curable composition:
  i) from 1 to 30 wt.-% of at least one chlorinated polyolefin;
  ii) from 0.2 to 5 wt.-% of at least one epoxysilane having at least one terminal alkoxy silane group selected from the group consisting of 3-glycidyloxypropyltrimethoxysilane, 3-glycidyloxypropyltriethoxysilane, 3-glycidyloxypropyltri-n-propoxysilane, 3-glycidyloxypropyltri-iso-propoxysilane, 3-glycidyloxypropyltri-n-butoxysilane and 3-glycidyloxypropyltri-iso-butoxysilane;
  iii) from 0.1 to 2 wt.-% of at least one bis-silane selected from bis-(trimethyoxysilylpropyl)urea and/or bis-(trimethoxysilylpropyl)amine; and
  iv) from 40 to 90 wt.-% of at least one organic solvent;
  v) from 0 to 50 wt.-% of at least one additive.

In this context it is preferred that the improved curable composition of the present invention of the invention is substantially free of nitroso-containing compounds. The term "nitroso-containing compound", as used herein, refers to any compound which comprises at least one nitroso functional group *—N=O. The term "substantially free of nitroso-containing compounds" means that the improved curable composition of the present invention comprises less than 1 wt.-%, preferably less than 0.1 wt.-%, more preferably less than 0.01 wt.-%, and particularly preferably less than 0.001 wt.-% of nitroso-containing compounds, each based on the total amount of the inventive improved curable composition. In another embodiment the improved curable composition of the present invention is totally free of nitroso-containing compounds. In a further embodiment the improved curable composition of the present invention is substantially free of isocyanate-containing compounds. The term "isocyanate-containing compound", as used herein, refers to any compound which comprises at least one isocyanate functional group *—NCO. The term "substantially free of isocyanate-containing compounds" means that the improved curable composition of the present invention comprises less than 1 wt.-%, preferably less than 0.1 wt.-%, more preferably less than 0.01 wt.-%, and particularly preferably less than 0.001 wt.-% of isocyanate-containing compounds, each based on the total amount of the inventive improved curable composition. It is also desirable that the total amount of all isocyanate-containing compounds and all nitroso-containing compounds is less than 1.5 wt.-%, preferably less than 0.15 wt.-%, more preferably less than 0.015 wt.-%, and particularly preferably less than 0.0015 wt.-% of nitroso-containing compounds, each based on the total amount of the inventive improved curable composition. In another embodiment the improved curable composition of the present invention is totally free of isocyanate-containing compounds or totally free of isocyanate-containing compounds and nitroso-containing compounds.

Another advantage of the improved curable compositions according to the present invention is that said improved curable compositions are capable of curing to provide excellent bond strength, especially when used to bond polar elastomeric substrates, such as nitrile butadiene rubber (NBR), hydrogenated nitrile butadiene rubber (HNBR) and/or ethylene acrylic elastomers to metallic substrates.

For example, in rubber to metal bonding tests to determine the bond strength of the improved curable composition of the present invention 85% to 100% rubber failure was observed. Furthermore, the resultant bonds have excellent hot water resistance.

In another aspect there is provided a process for bonding a material to a substrate, comprising the steps of:
a) providing a curable composition as defined herein;
b) providing the material to be bonded in a non-cured form, and
c) simultaneously curing the composition and the material to be bonded so that the material is bonded to the substrate.

Suitably, the material to be bonded cures can form an elastomer, such as rubber.

In a other aspect there is provided a process for bonding a first substrate to a second substrate, comprising the steps of:
a) providing a curable composition as defined herein;
b) applying the curable composition to at least one part of the surface of the first substrate; and
c) contacting said surface of the first substrate with a surface of a second substrate, to which the curable composition is optionally applied, under conditions of heat and pressure sufficient to create a cured bond between the two substrates.

Desirably, the first substrate is an elastomer which is vulcanised or crosslinked prior to bonding to the second substrate Suitably, the first substrate is a rubber, and the second substrate is a metal surface.

Suitably, the rubber is vulcanised or crosslinked concurrently with bonding to the metal surface.

In a related aspect, a process for crosslinking an elastomeric material, comprising the steps of:
a) providing a composition in a non-cured form comprising
(i) at least one aromatic nitroso or at least one aromatic nitroso precursor compound or combinations thereof; and
(ii) a film former component comprising at least one non-halogenated hydroxy group-containing resin together with at least one crosslinking agent;
b) mixing the composition with at least one elastomeric material to form a curable mixture; and
c) exposing said mixture to conditions of heat and pressure sufficient to crosslink the elastomer.

Suitably, the elastomeric material may be a rubber.

Desirably, the film former component may be used in combination with at least one sulfur impregnated particulate solid as defined above.

Preferably, the mixture is exposed to heat at a temperature of above about 50° C., more suitably above about 50° C., more suitably still above about 80° C. The most preferred temperature range is between about 150° C. and about 180° C.

Optionally a pressure of above 1 bar may be applied.

Prior to bonding, the surface of the metallic substrate may be cleaned according to one or more methods known in the art, such as degreasing, grit-blasting and zinc-phosphatizing.

As noted above it is a particular advantage that the improved curable compositions of the present invention can be used for bonding polar elastomeric materials to metallic substrates, as described above.

In one embodiment of the process of the present invention the first substrate may be a metallic substrate and/or the second substrate may comprises or consists of an elastomeric material, like polar elastomeric materials, such as nitrile butadiene rubber (NBR), hydrogenated nitrile butadiene rubber (HNBR) and/or ethylene acrylic elastomers and/or any combination or mixture thereof.

In step b) of the process described above, the improved curable composition of the invention may be applied to at least one part of the surface of the first substrate, e.g., to at least one part of the metallic surface by spraying dipping, brushing, and/or wiping. After the improved curable composition has been applied, it is preferred that the formed coating is permitted to dry. In some cases, it may be desirable to preheat the first substrate, such as the metallic substrate prior to application of the improved curable composition of the present invention to assist in drying of the improved curable composition. Particularly durable improved curable composition bonds are obtained when the improved curable composition of the present invention is applied in an amount sufficient to form a film having a film thickness in the range of about 3 µm to about 20 µm, more preferably of about 6 µm to about 12 µm.

Than in step c) of the process of the present invention the surface of the first substrate is contacted with the surface the second substrate, to which the improved curable composition is optionally applied, under conditions of heat and pressure sufficient to create an improved curable composition bond between the two substrates.

In a preferred embodiment of the present invention the improved bond between the two substrates is formed in step c) of the process of the present invention results from bringing the two substrates together under a pressure from about 20 MPa to about 200 MPa, preferably from about 25 MPa to 50 MPa at a temperature from about 100° C. to about 200° C., preferably from about 160° C. to about 190° C. The formed assembly should preferably remain under the applied pressure and temperature for a period of time of about 1 min to 60 min, more preferably for a period of time of about 3 min to 20 min.

The conditions of heat and pressure sufficient to create an improved bond between the two substrates could vary depending on the chemical composition of the improved curable composition of the present invention and/or depending on the vulcanization rate of the elastomeric substrate. In one embodiment of the present invention the elastomeric substrate is vulcanized concurrently with bonding to the surface of the metallic substrate in step c) of the inventive process.

In an alternative embodiment the elastomeric substrate is already vulcanized prior to the bonding process, which means that substantially no vulcanization of the elastomeric substrates occurs in step c) of the process of the present invention.

Generally, it is desirable that bonding is achieved during the vulcanization of the elastomeric substrate.

The process of the present invention may be carried out by applying an elastomeric substrate as a semi-molten material to an improved curable composition coated metal surface as in, for example, an injection-molding process. The process of the present invention may also be carried out by utilizing compression molding, transfer molding or autoclave curing techniques. After the process is complete, a bonded assembly is formed, in which the fully vulcanized elastomeric material is bonded to a metallic substrate by the cured product of the inventive improved curable composition of the invention, which comprises the film former described above.

Therefore, another aspect of the present invention is an article or assembly comprising at least two substrates bound together by the cured product of the improved curable composition of present invention, which comprises the film former described above.

In a further aspect, the present invention relates to an assembly comprising a first substrate and a second substrate bonded together by an cured improved curable composition of present invention, which comprises the film former described above.

Desirably, one of the substrates is an elastomer, such as a natural or synthetic rubber. The second substrate may be an elastomer, a metal, glass or other hydroxylated substrate. The invention further extends to a cure product comprising a polymer, for example an elastomer, such as a natural or synthetic rubber and a composition according to the present invention.

The article of the present invention is preferably a bonded assembly which comprises at least one metallic substrate bonded to at least one elastomeric substrate by the cured product of improved curable composition of the invention, wherein the elastomeric substrate is preferably selected from nitrile butadiene rubber (NBR), hydrogenated nitrile butadiene rubber (HNBR) and/or ethylene acrylic elastomers.

The article or bonded assembly of the present invention is ready for use in a final application including, but not limiting to, engine mount, damper, or belting. A further aspect of the present invention is the use of an improved curable composition of the present invention for bonding a first substrate to a second substrate, wherein one substrate is an elastomeric substrate. Suitable metallic substrates and suitable polymeric substrate, elastomeric substrates, and polar elastomeric substrates are described above.

As discussed above, excellent adhesion between polymeric materials, such as elastomeric materials, for example rubber compositions, and metals or hydroxylated surfaces, may be realized through the use of the improved compositions described herein, wherein they include film former as define above.

In yet a further aspect the present invention provides for a cure product comprising a substrate and an improved composition according to the present invention.

Another aspect of the present invention relates to an article, comprising at least two substrates bound together by the cured product of an improved composition of the present invention.

Wherein a metal substrate coated with an improved curable composition of the invention as so described may be adhered to a polymeric material, for example a rubber composition, by applying the polymeric material in an uncured state onto the metal coated with the improved curable composition and curing the polymeric material thereon to bond it to the metal.

In the case of a rubber polymeric material the uncured rubber may be vulcanized via heat and pressure over a period of time to cure the rubber, resulting in bonding of the rubber to the metal.

The method may further comprise the step of heating subsequent to mating the first and second substrates. Advantageously, heating may increase the rate of bond formation. Heating may improve bond strength.

In another aspect there is provided a film forming component for use in a binding curable composition the component comprising at least one aromatic nitroso or at least one aromatic nitroso precursor compound and combinations thereof;
together with a film former component comprising at least one non-halogenated hydroxy group-containing resin together with at least one crosslinking agent.

Desirably, the at least one aromatic nitroso or at least one aromatic nitroso precursor compound comprises a compound comprising:
  at least one alkoxy silane moiety; and
  at least one moiety selected from an aromatic nitroso or an aromatic nitroso precursor and combinations thereof.

The improved composition of the invention solid may be applied to a target substrate as a thin film or coating. This may allow for uniform (or even) application of the composition to the target substrate. Uniform application of the composition to a target substrate may allow for improved bonding.

The method of the present invention may additionally comprise the step of:
  i. substantially hydrolysing the nitrosilane component of the composition of the present invention.

At least one alkoxy (or acyloxy) moiety in the compound may be hydrolysed to ensure good bonding. As will be appreciated by a person skilled in the art, the order of steps a) and b) may be reversed. For example, the product may be applied to at least one substrate and then hydrolysed, or the product may be hydrolysed prior to application to the at least one substrate.

In a further aspect, the present invention provides for a method of bonding two substrates together, the method comprising providing a composition comprising film former defined above and
  1. substantially hydrolysing a component comprising:
     a) at least one alkoxy silane moiety; and
     b) at least one moiety selected from an aromatic nitroso or an aromatic nitroso precursor and combinations thereof;
  2. applying the substantially hydrolysed compound of step 1 to at least one substrate; and
  3. mating the first and second substrates so as to form a bond therebetween.

At least one alkoxy moiety in the compound may be hydrolysed to ensure good bonding. As will be appreciated by a person skilled in the art, the order of steps 1 and 2 is inconsequential. For example, the product may be applied to at least one substrate and then hydrolysed, or the product may be hydrolysed prior to application to the at least one substrate. The method may further comprise the step of heating subsequent to mating the first and second substrates. Advantageously, heating may increase the rate of bond formation. Heating may improve bond strength.

In yet a further aspect, the present invention provides for a method of bonding two substrates together comprising:
  1. providing a composition comprising film former (according to the present invention) having and further comprising:
     (i) a compound comprising:
        a) at least one alkoxy silane moiety; and
        b) at least one moiety selected from an aromatic nitroso or an aromatic nitroso precursor and combinations thereof; and
     (ii) a carrier for the compound, the carrier comprising at least 0.1% w/w water;
  2. heating the composition; and
  3. applying a composition to a bonding surface of at least one of the substrates and bringing the bonding surfaces of the substrates together.

As will be appreciated by a person skilled in the art, the order of steps 2 and 3 is inconsequential. For example, the composition may be applied to at least one substrate and then heated, or the composition may be heated prior to application to the at least one substrate.

The provision of heat may aid in the hydrolysis of the alkoxy silane moiety of the compound. The composition may be heated to a temperature between 30-100° C. Suitably, the composition may be heated to a temperature between 40-60° C. The composition may be heated to 50° C. The composition may be heated for between 1-2 hours. The composition may be heated for up to 2 hours. The composition may be applied directly to the target substrate. The composition may be cooled prior to application to the target substrate.

The improved composition may be applied to a target substrate as a thin film or coating. This may allow for uniform (or even) application of the composition to the target substrate. Uniform application of the composition to a target substrate may allow for improved bonding.

The method may further comprise the step of heating subsequent to bringing the surfaces together. Advantageously, heating may increase the rate of bond formation. Heating may improve bond strength, durability and resistance under certain conditions as described above.

Thus, a metal coated with an adhesive composition as so described may be adhered to a polymeric material, for example a rubber composition, by applying the polymeric material in an uncured state onto the metal coated with the adhesive composition and curing the polymeric material thereon to bond it to the metal. In the case of a rubber polymeric material the uncured rubber may be vulcanized via heat and pressure over a period of time to cure the rubber, resulting in bonding of the rubber to the metal.

Such bonding to metal and or hydroxylated surfaces is achieved through the nitroso groups which are capable of reacting with polymers. The polymer may comprise alkene/allylic functionality within the polymer chain. For example, diene or allylic functionality within the polymer chain.

Excellent adhesion between polymeric materials, such as rubber compositions, and metals or hydroxylated surfaces, with minimal waste of silane solution, may be realized through the use of the compounds and compositions as so described. With reference to their use in adhesive applications, the compositions of the present invention are generally thinner than the compositions present in the traditional adhesive systems for rubber bonding, without any loss in performance characteristics.

In a further aspect the present invention provides for a substrate having a composition according to the present invention pre-applied thereto for subsequent bonding to a second substrate. As used herein, the term pre-applied indicates that the composition of the present invention may be applied to a substrate such that it remains secured thereto, and the resulting pre-treated substrate is suitable for storage. The composition should retain its efficacy over time. The pre-treated substrate may be stored for subsequent bonding to a second substrate. Advantageously, substrates can be coated with the composition in a pre-treatment process, optionally stored, and subsequently utilised in (automated) manufacturing processes. The composition may be pre-applied to a polymeric substrate (such as an elastomer, for example a natural or synthetic rubber), a metal or a hydroxylated surface. The composition may be pre-applied to a metal or a hydroxylated surface. Advantageously, the film former of the invention has tailorable reactivity that can be adjusted by appropriate selection of the at least one non-halogenated hydroxy group containing resin and crosslinker, and selection of amounts used and conditions applied, to deliver the correct level of robustness, and at the same time, allow excellent bonding to the rubber. The film former of the invention gives better control than the chlorinated olefin film formers (a number of the examples of the present invention herein should show excellent pre-bake resistance i.e. up to 10 minutes).

In a further aspect, the present invention provides for a container having therein a composition comprising film former (according to the present invention) comprising:
  (i) a compound comprising:
    a) at least one alkoxy silane moiety; and
    b) at least one moiety selected from an aromatic nitroso or an aromatic nitroso precursor and combinations thereof; and
  (ii) a carrier for the compound, the carrier comprising at least 0.1% w/w water. The compound may be substantially hydrolysed.

In yet a further aspect, the present invention provides for use of providing a composition comprising film former (according to the present invention) heated from 30 to 100° C. for bonding two substrates together, the composition (according to the present invention) comprising:
  1. a compound comprising:
    a) at least one alkoxy silane moiety; and
    b) at least one moiety selected from an aromatic nitroso or an aromatic nitroso precursor and combinations thereof; and
  2. a carrier for the compound, the carrier comprising at least 0.1% w/w water.

The composition may be heated to a temperature between 40-60° C. The composition may be heated to 50° C. The heated composition may be applied directly to the target substrate. The composition may be cooled prior to application to the target substrate.

In yet a further aspect the present invention provides a process for bonding two substrates together comprising the steps of:
  (i) providing an improved curable composition comprising film former as defined herein;
  (ii) applying a primer comprising a silicate, an aluminate, a germanate or combinations thereof to at least one substrate;
  (iii) applying a compound comprising;
    a) at least one alkoxy silane moiety; and
    b) at least one moiety selected from an aromatic nitroso or an aromatic nitroso precursor and combinations thereof;
    to at least one substrate, and
  (iv) mating the first and second substrates so as to form a bond with the composition.

It will be appreciates that these process may also utilise at sulfur impregnated particulate solid in combination with the film former of the invention.

As used herein, the term "applying a primer comprising a silicate, an aluminate, a germanate or combinations thereof" refers to applying an amount of a silicate, an aluminate, a germanate or combinations thereof to a surface for subsequent application of a compound comprising at least one alkoxy silane moiety and at least one aromatic nitroso (precursor) moiety. For example, the primer comprising a silicate, an aluminate, a germanate or combinations thereof may be applied as a deposit, monolayer, thin film, layer, etc. Suitably, a primer comprising a silicate, an aluminate, a germanate or combinations thereof may be applied to the surface of a first substrate for the purpose of priming said first substrate for subsequent bonding to a second substrate. The primer may comprise a silicate, an aluminate or combinations thereof.

The primer comprising a silicate, an aluminate, a germanate or combinations thereof may be applied to one substrate or both substrates. Advantageously, applying a primer comprising a silicate, an aluminate, a germanate or combinations thereof to substrates may result in improved cure strength, particularly in production and automated processes.

The primer comprising a silicate, an aluminate, a germanate or combinations thereof may be applied to the at least one substrate in a suitable carrier. For example, the carrier may be a solvent, a wetting agent or a dispersing medium.

The primer may comprise a component selected from the group comprising glass such as glass fibres, quartz, clays, talcs, zeolites, porcelains, ceramics, silicon substrates and combinations thereof. The primer may comprise a silicate.

As discussed above, the first substrate and/or the second substrate may be a metallic substrate, a glass substrate or a substrate made of fabrics. Alternatively, it is possible that the first substrate and/or the second substrate comprise(s) or consist(s) of a polymeric material, such as an elastomeric material, like natural or synthetic rubber. Preferred improved curable compositions of the present invention are one-coat improved curable compositions which are adapted to be utilized to bond polymers, such as elastomeric materials to other substrates, such as metallic substrates without the use of a primer. Suitable elastomeric materials are described above.

The inventive primers and compounds (and compositions) utilised in the method of the present invention may be used in a pre-applied format. As used herein, the term pre-applied indicates that the primer or compound or compositions of the present invention may be applied to a substrate such that it remains secured thereto, and the resulting pre-treated substrate is suitable for storage. The primer or compound of composition should retain its efficacy over time. The pre-treated substrate may be stored for subsequent bonding to a second substrate.

For example, this may involve pre-applying a primer comprising a silicate, an aluminate, a germanate or combinations thereof to a first substrate, such that it remains secured thereto. Advantageously, substrates can be primed in a pre-treatment process, optionally stored, and subsequently utilised in (automated) manufacturing processes.

Accordingly, the invention further provides for a substrate having a primer comprising a silicate, an aluminate, a germanate or combinations thereof applied thereto for the purpose of priming said substrate for subsequent bonding to a second substrate using a compound comprising at least one alkoxy silane moiety; and at least one moiety selected from an aromatic nitroso or an aromatic nitroso precursor and combinations thereof. At least one of the substrates may comprise a polymer comprising diene or allylic functionality within the polymer chain, for example, the polymer may be an elastomer, such as natural or synthetic rubber. The synthetic rubber may be a nitrile butadiene rubber. The synthetic rubber may be HNBR.

The invention further provides for a substrate having a compound comprising at least one alkoxy silane moiety; and at least one moiety selected from an aromatic nitroso or an aromatic nitroso precursor and combinations thereof pre-applied thereto for subsequent bonding to a second substrate. A first substrate may comprise a hydroxylated surface as defined herein. A second substrate may comprise a polymer. The polymer may comprise diene or allylic functionality within the polymer chain, for example, the polymer may be an elastomer, such as natural or synthetic rubber. The synthetic rubber may be a nitrile butadiene rubber. The synthetic rubber may be HNBR. Advantageously, substrates can be pre-treated and subsequently utilised in (automated) manufacturing processes.

The primer or compound or composition of the present invention may be pre-applied to the polymeric substrate (such as an elastomer, for example a natural or synthetic rubber), or the hydroxylated surface. The composition may be pre-applied to the hydroxylated surface. In a further aspect, the invention relates to use of a film former according to the invention in the manufacture of a curing composition. The invention extends to use of a composition comprising a film former as defined herein as a film former in the manufacture of a curing composition. In such use, the curing composition is a composition for bonding an elastomeric material to a substrate for example elastomer, metal, glass or other hydroxylated substrate. Suitably, the curing composition cures during a vulcanisation process. The curable composition comprising the film former of the invention may be used as a crosslinking agent for elastomeric materials.

The invention extends to a cure product of a curable composition as described herein or the uses as described herein.

The inventive methods, compounds and compositions of the present invention may find utility in the following non-limiting applications: manufacture of automotive timing belts, bonding to glass/glass fibre reinforced plastic and composite parts, manufacture of reinforced rubbers, tyre manufacture, conveyor belt manufacture and the manufacture of woven materials such as clothing, for example protective clothing.

The inventive methods, compounds and compositions of the present invention may find utility in the following non-limiting applications: manufacture of automotive timing belts, bonding to glass/glass fibre reinforced plastic and composite parts, manufacture of reinforced rubbers, tyre manufacture, conveyor belt manufacture and the manufacture of woven materials such as clothing, for example protective clothing.

Where suitable, it will be appreciated that all optional and/or preferred features of one embodiment of the invention may be combined with optional and/or preferred features of another/other embodiment(s) of the invention. In particular the sulfur-impregnated particulate solid material can be utilised will all possible compositions of the invention as set out above.

DETAILED DESCRIPTION

It should be readily apparent to one of ordinary skill in the art that the examples disclosed herein below represent generalised examples only, and that other arrangements and methods capable of reproducing the invention are possible and are embraced by the present invention.

EXAMPLES

Prebaking occurs when a metal part coated with a bonding agent (for example in bonding a rubber to metal assembly) is exposed to high temperatures (>160° C.) prior to vulcanization of the rubber. When the rubber to metal bonding agent contains as part of its composition a chlorinated polyolefin and in particular a chlorinated polyethylene with high chlorine content, poor bonding strengths can be observed after this prebaking process. By the inclusion of film former component of the present invention, for example, isocyanates, either free, blocked or a combination of both, epoxy resin or a phenolic resin, prebaked bond strengths are significantly increased.

When chlorinated polyolefin is removed completely from the formulation, and replaced by the film former component of the invention, a robust, tack free coating may be produced. Polymers resins containing hydroxyl groups such as polyvinyl butyral and cellulose acetate butyrate have been used herein. The addition of the film former component of the present invention, to formulations containing such polymers significantly increases bond strengths.

Other methods to solve the prebaked bond issues have been to completely remove or replace the chlorinated polyolefin from the system, which may lead to decreased bond performance and so the film former component of the invention provides an excellent alternative.

Rubber to Metal Bond Testing

Bonded parts were pulled to destruction according to WDK (Association of German Rubber Manufacturing Industry) Guideline 2000 (Assessment of Rubber to Metal Bonding Agents for NVH Applications) outlined below. To test the performance of the bonds produced by the compositions of the invention, P-25 buffer parts are used, which are part of the ASTM-D429-Method F testing procedure.

Examples of compositions comprising the film former of the present invention.

Example 1

| Input: | 3699-056 % |
|---|---|
| Nitrososilane | 8 |
| BSU | 1.5 |
| DER 669E | 1.5 |
| Silica (Cabosil TS-720) | 1.5 |
| PVB (Butvar 72A) | 2 |
| Carbon Black (HGD4S) | 2.5 |
| Ethyl acetate | 83 |
| | 100 |
| Initial Strength | 8.3 MPa |
| 5 minute Pre-bake Strength | 8.8 MPa |

Bond Testing according to WDK Standard
PVB = Poly vinyl butyral
BSU = N,N-bis(3-Trimethoxysilylpropyl)urea
DER-669E = High mw solid epoxy resin (Dow)

Example 2

| Input: | 3699-062 % |
|---|---|
| Nitrososilane | 8 |
| DER-669E | 1.5 |
| BSU | 1.5 |
| Silica (Cabosil TS-720) | 2 |
| PVB (Mowital B30H) | 1.5 |
| Carbon Black (HGD4S) | 2.5 |
| CXC-1612 | 0.1 |
| Ethyl acetate | 82.9 |
| | 100 |
| Initial Bond Strength | 9.1 Mpa |
| 5 minute Pre-bake Strength | 9.2 MPa |

Bond Testing according to WDK Standard
PVB = Poly vinyl butyral
BSU = N,N-bis(3-Trimethoxysilylpropyl)urea
CXC-1612 = Ammonium hexafluoroantimonate (King Industries)
DER-669E = High mw solid epoxy resin (Dow)

Example 3

| Input: | 3699-072 % |
|---|---|
| Nitrososilane | 8 |
| BSU | 1.5 |
| DER 669-E | 1.5 |
| PVB (Mowital B60HH) | 2 |
| Silica (Cabosil TS-)720 | 1.5 |
| Carbon Black (HGD4S) | 2.5 |
| CXC-1612 | 0.01 |
| Ethyl acetate | 82.99 |
| | 100 |
| Initial Strength | 8.1 MPa |
| 5 minute Pre-bake Strength | 9.8 MPa |

Bond Testing according to WDK Standard
PVB = Poly vinyl butyral
BSU = N,N-bis(3-Trimethoxysilylpropyl)urea
CXC-1612 = Ammonium hexafluoroantimonate (King Industries)
DER-669E = High mw solid epoxy resin (Dow)

Example 4

| Input: | 3699-101 % |
|---|---|
| Nitrososilane | 8 |
| BSU | 1.5 |
| DER 669-E | 1.5 |
| PVB (Mowital B30H) | 2 |
| Silica (CabosilTS-720) | 1.5 |
| Carbon Black (HGD4S) | 2.5 |
| $NH_4 PF_6$ | 0.1 |
| Ethyl acetate | 82.9 |
| | 100 |
| Initial Strength | 10.2 MPa |
| 5 minute Pre-bake Strength | 9.3 MPa |

Bond Testing according to WDK Standard
PVB = Poly vinyl butyral
BSU = N,N-bis(3-Trimethoxysilylpropyl)urea
DER-669E = High mw solid epoxy resin (Dow)

Example 5

| Input: | 3640-102 % |
|---|---|
| Nitrososilane | 8 |
| BSU | 1.5 |
| Methylon 75-108 | 1.5 |
| PVB (Mowital 60T) | 1 |
| Silica (Aerosil 200) | 1.5 |
| Carbon Black (HGD4S) | 2.5 |
| $NaSbF_6$ | 0.1 |
| Ethyl acetate | 63.9 |
| Isopranol | 20 |
| | 100 |
| Initial Strength | 9.9 MPa |
| 5 minute Pre-bake Strength | 10.8 MPa |

Bond Testing according to WDK Standard
PVB = Poly vinyl butyral
BSU = N,N-bis(3-Trimethoxysilylpropyl)urea
Methylon 75-108 = Phenol Formaldehyde Resin All parts are % weight by weight of the composition. *All parts are parts by weight

Example 6

| Input: | 3729-24 % |
|---|---|
| Ethyl acetate | 56.7 |
| IPA | 20 |
| DNB (30% wt. soln. in xylene) | 16.7 |
| Carbon Black (HGD4S) | 2.5 |
| Methylon 75108 | 1.5 |
| Silica (Aerosil 200) | 1.5 |
| PVB (Mowital 60T) | 1 |
| NaSbF6 | 0.1 |
| | 100 |
| Initial Strength | 5.7 MPa |
| 5 minute Pre-bake Strength | 6.1 MPa |

Bond Testing according to WDK Standard
PVB = Poly vinyl butyral

Example 7

| Input: | 3634-9 % |
|---|---|
| Xylene | 70 |
| HPE1305 | 10 |
| Ethyl Acetate | 8 |
| Nitrososilane | 8 |
| Carbon Black (CK3) | 2.5 |
| BSU | 1.5 |
| | 100 |
| Initial Strength | 2.2 MPa |
| 5 minute Pre-bake Strength | 1.5 MPa |

HPE1305 = Chlorinated Polyethylene

Example 8

With polyvinyl butyral: General improvement in bond strengths by the inclusion of an isocyanate

| Input: | 3705-26 % A | % B |
|---|---|---|
| Nitrososilane | 8 | 8 |
| BSU | 1.5 | 1.5 |
| Carbon Black (HGD4S) | 2.5 | 2.5 |
| Silica (Cabosil TS-720) | 1.5 | 1.5 |
| PVB (Mowital B60HH) | 2 | 2 |
| Desmodur XP2714 | 0 | 2 |
| Ethyl Acetate | 84.5 | 82.5 |
| | 100 | 100 |
| Initial Strength | 5.1 MPa | 7.2 MPa |
| 5 minute Pre-bake Strength | 7.6 MPa | 9.5 MPa |

Bond Testing according to WDK Standard
PVB = Poly vinyl butyral
BSU = N,N-bis(3-Trimethoxysilylpropyl)urea

Example 9

With cellulose acetate butyrate: General improvement in bond strengths by the inclusion of an isocyanate.

| Input: | 3705-43 % A | % B |
|---|---|---|
| Nitrososilane | 8.0 | 8.0 |
| BSU | 1.5 | 1.5 |
| Carbon Black (HGD4S) | 2.5 | 2.5 |
| Silica (Aerosil 200) | 1.5 | 1.5 |
| CAB 381-20 | 2.0 | 2.0 |
| Desmodur XP2714 | 0.0 | 2.0 |
| Ethyl Acetate | 19.5 | 24.2 |
| Xylene | 65.0 | 58.3 |
| | 100.0 | 100.0 |
| Initial Strength | 4.4 MPa | 9.1 MPa |
| 5 minute Pre-bake Strength | 6.5 MPa | 9.3 MPa |

Bond Testing according to WDK Standard
PVB = Poly vinyl butyral
BSU = N,N-bis(3-Trimethoxysilylpropyl)urea
CAB = Cellulose Acetate Butyrate Addition of isocyanates (such as Desmodur XP2714 to formulations of a rubber to metal bonding agent that contains
1) a hydroxyl functional polymer such as Mowital B60HH or Eastman CAB 381-20 (PCAB)
2) the nitrososilane molecule defined herein (and see WO2009/118255) significantly increases bond performance, by crosslinking as shown in Examples 8&9

Components Used
Polyisocyanate
Description: Silane functional polyisocyanate with allophanate structure based on hexamethylene diisocyanate; Form: 100% solids; NCO content: approx 16%. Desmodur XP2714:Supplied from Bayer Material Science Cellulose Acetate Butyrate Polymer
Cellulose acetate butyrate polymer used in the present invention contains: Hydroxyl content—0.5-5 wt %, Acetyl content—1-30, Butyryl content—15-65 wt %. A preferred grade, CAB381-20, is supplied by Eastman.

Poly Vinyl Butyral (PVB) Polymer
Average molar mass of PVB polymers: ~12,000-100,000. Suitable PVB grades include:

| Grade | Content of polyvinyl alcohol [1] | Content of polyvinyl acetate [2] |
|---|---|---|
| Mowital B 16 H | 18-21 | 1-4 |
| Mowital B B20 H | 18-21 | 1-4 |
| Mowital B 30 T | 24-27 | 1-4 |
| Mowital B 30 H | 18-21 | 1-4 |
| Mowital B 30 HH | 11-14 | 1-4 |
| Mowital B 45 M | 21-24 | 1-4 |
| Mowital B 45 H | 18-21 | 1-4 |
| Mowital B 60 T | 24-27 | 1-4 |
| Mowital B 60 H | 18-21 | 1-4 |
| Mowital B 60 HH | 12-16 | 1-4 |
| Mowital B 75 H | 18-21 | 0-4 |

[1] Hydroxyl groups in terms of polyvinyl alcohol
[2] Acetyl groups in terms of polyvinyl acetate A number of preferred grades of PVB is supplied by Kuraray. One example of a preferred grade of PVB suitable for use in the compositions of the present invention, contains as co-polymers: Polyvinyl Alcohol content: 12-16% and Polyvinyl Acetate content: 1-4%.

Sulfur Impregnated Particulate Solids & Testing
The sulfur impregnated particulate solid that can be used are sulfur impregnated powered activated carbons or sulfur impregnated powered charcoals.

A first example of a suitable material is Desorex DY 700 S (Donau Carbon). This is a steam activated powdered carbon, based on selected grades of coal. The activated carbon is impregnated with sulfur in a special, thermal production process and has a good adsorption capacity.

| Desorex DY 700 S | |
|---|---|
| Impregnation (wt %) | Ca. 1 |
| Moisture content (wt %) | |
| Iodine adsorption (mg/g) | >700 |
| Total surface area (m2/g) (BET-method) | approx. 700 |
| Granulation (%) (<300 mesh) | Min. 85 |

A second example of a suitable material is Desorex HGC 8×16 S, which is a granular S impregnated activated carbon which is based on coconut shells. The material can be used for the removal of mercury from flue gas, natural gas or other waste gases.

| Desorex HGC 8 × 16 S | |
|---|---|
| Specifications: | |
| Impregnation (wt %) | approx. 10 |
| Bulk density (kg/m$^3$) | 500 ± 30 |
| Moisture content (wt %) (as packed) | <10 |
| Granulation (mesh) | 8 × 16 |
| Product data before impregnation: | |
| Total surface area (m$^2$/g) (BET-method) | approx. 1000 |
| CTC-adsorption (wt %) | >60 |

A third example of a suitable material is Desorex HGD 4S, which is a sulfur impregnated carbon based on coal. A special thermal impregnation process guarantees a high filtration efficiency and long life time of the activated carbon. Desorex HGD 4S is produced, based on a high activated carbon and has a high adsorption capacity for mercury as well as for organic impurities.

| Desorex HGD 4 S | |
|---|---|
| Specifications: | |
| Impregnation (wt %) | min. 10 |
| Bulk density (kg/m$^3$) | 560 ± 30 |
| Moisture content (wt %) (as packed) | <10 |
| pH - value | approx. 3 |
| Diameter of particles (mm) | approx. 4 |
| Product data before impregnation: | |
| Total surface area (m$^2$/g) (BET-method) | 1000 |
| Iodine adsorption (mg/g) | 950 |
| CTC-adsorption (wt %) | >60 |

CK3 (CAS RN 1333-86-4), is a carbon black for application which is used as a reinforcing filler in rubber compounds. The CK 3 used herein is an industrially produced carbon black. CK 3 is a gas black which imparts considerable scorch safety to rubber compounds by delaying the onset of cure.

| CK 3 (Carbon Black) | | | |
|---|---|---|---|
| Specifications: | | | |
| CTAB surface area | m$^2$/g | 88 | ASTM D 3765 |
| Tint strength (IRB = 100) | % | 116 | ASTM D 3265 |
| OAN | ml/100 g | 104 | ASTM D 2414 |
| pH value | | 3.5 | ISO 787/9 |
| Ash content | % | 0.05 | ASTM D 1506 |
| Heating loss at packing | % | 1.5 | ASTM D 1509 |
| Sieve residue 325 mesh | ppm | 10 | ASTM D 1514 |
| Pour density | g/dm$^3$ | 350 | ASTM D 1513 |

The BET surface area of the Desorex and CK3 grades are: Desorex HGC 8×16S=total surface area before impregnation with sulfur approx 1000 m$^2$/g (from TDS); Desorex HGD-4S=total surface area before impregnation with sulfur 1000 m$^2$/g (from TDS); Desorex DY700S=approx 700 m$^2$/g (from TDS); Carbopal MB4S(Sulfur free activated carbon for control experiments)=900 m$^2$/g (from TDS); and CK3=88 m$^2$/g (from TDS via the CTAB test method, which has been superseded by the BET ASTM test).

Examples of the sulfur impregnated carbon compared to a standard carbon black particle (CK3).

| Different carbons | A | B | C | D |
|---|---|---|---|---|
| Nitrososilane | 8 | 8 | 8 | 8 |
| Ethyl acetate | 8 | 8 | 8 | 8 |
| BSU | 0.3 | 0.3 | 0.3 | 0.3 |
| Glymo | 0.9 | 0.9 | 0.9 | 0.9 |
| Superchlon HE1200 | 10 | 10 | 10 | 10 |
| CK3 | 2.5 | 0 | 0 | 0 |
| Desorex HGC | 0 | 2.5 | 0 | 0 |
| Desorex HGD-4S | 0 | 0 | 2.5 | 0 |
| Desorex DY700S | 0 | 0 | 0 | 2.5 |
| Xylene | 70.3 | 70.3 | 70.3 | 70.3 |
| initial | 8.1 | 8.4 | 9.5 | 10.8 |
| steam | 5 | 9.5 | 9.1 | 8.5 |

Examples of different grades of chlorinated polymers with a sulfur impregnated carbon. The grades HPE1515, Superchlon HE1200 and HPE2200H all contain >65% chlorine content. The molecular weights are between 50 and 150,000 g/mol.

| Different chlorinated polymers with a Sulfur impregnated carbon | F | G | H |
|---|---|---|---|
| Nitrososilane | 8 | 8 | 8 |
| Ethyl acetate | 8 | 8 | 8 |
| BSU | 0.3 | 0.3 | 0.3 |
| Glymo | 0.9 | 0.9 | 0.9 |
| Superchlon HE1200 | 10 | 0 | 0 |
| HPE1515 | 0 | 10 | 0 |
| HPE2200H | 0 | 0 | 10 |
| Desorex HGC 8 × 16 s | 2.5 | 2.5 | 2.5 |
| Xylene | 70.3 | 70.3 | 70.3 |
| initial | 8.4 | 8.7 | 6.8 |
| steam | 9.5 | 3.9 | 5.5 |

CONCLUSION

The bond strength results indicate that use of curable compositions comprising the film former component of the present invention, that is a non-halogenated hydroxylated resin and a suitable crosslinking agent, in combination with a nitroso-containing material, shows a demonstrable increase in bond performance in both initial and 5-minute pre-bake testing. In particular the pre-bake results demonstrate superior performance of the film former system of the invention. The robustness of this film former in curable compositions means the compositions can be applied to a substrate prior to transport or storage so that they are ready to use as requires and do not display any reduced bond quality on cure.

As described above, the film former of the invention has tailorable properties depending on the nature of the non-halogenated hydroxylated resin and a suitable crosslinking agent chosen for a given application, cure and operating conditions.

Inclusion of a sulfur impregnated particulate solid into these compositions is advantageous from the point of view that increase bond durability and resistance is improved post cure.

The invention claimed is:

1. A curable composition comprising:
   (i) at least one aromatic nitroso or at least one aromatic nitroso precursor compound or combinations thereof; and
   (ii) a film former component comprising at least one non-halogenated hydroxy group-containing resin together with at least one crosslinking agent selected from a phenolic resin, an epoxy resin having at least two oxirane ring systems and combinations thereof.

2. The curable composition of claim 1 wherein the at least one non-halogenated hydroxyl group-containing resin includes a co-polymer which is a co-polymer of at least one of polyvinyl alcohol, polyvinyl butyral and polycellulose acetate butyrate.

3. The curable composition of claim 1, wherein the non-halogenated hydroxy group-containing resin is present in the composition in a range of from about 0.5 to 10% wt/wt of the total weight of the curable composition.

4. The curable composition of claim 1, wherein the at least one crosslinking agent is a compound having at least two reactive moieties, each of which can undergo a crosslinking reaction with a hydroxy group of the at least one non-halogenated hydroxy group-containing resin.

5. The curable composition of claim 1, wherein the crosslinking agent is a phenolic resin.

6. The curable composition of claim 1, wherein the crosslinking agent is an epoxy resin having at least two at least two oxirane ring systems.

7. The curable composition of claims 1, wherein the at least one aromatic nitroso compound or at least one aromatic nitroso precursor compound comprises at least one alkoxy silane moiety and at least one moiety selected from an aromatic nitroso or an aromatic nitroso precursor or combinations thereof.

8. The curable composition of claim 1, further comprising a compound comprising:
   (a) at least one phosphonate moiety; or
   (b) at least one phosphinate moiety, or combinations thereof.

9. The curable composition of claim 8 wherein the compound is of the general formula:

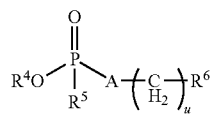

wherein u is from 0 to 20; A is a direct bond or O; $R^4$ is selected from the group consisting of H, $C_1$-$C_{24}$ alkyl, and $C_3$-$C_{24}$ acyl; $R^5$ is selected from the group consisting of $C_1$-$C_{24}$ alkyl, $C_1$-$C_{24}$ alkoxyl and $C_3$-$C_{24}$ acyl; and $R^6$ is a moiety comprising nitrosobenzene, quinone oxime or quinone dioxime.

10. The curable composition of claim 1, wherein the aromatic nitroso precursor is a nitrosobenzene precursor or comprises an aromatic oxime or an aromatic dioxime or combinations thereof.

11. A process for bonding a material to a substrate, comprising the steps of:
   a) providing a curable composition as defined in claim 1;
   b) providing the material to be bonded in a non-cured form, and
   c) simultaneously curing the composition and the material to be bonded so that the material is bonded to the substrate.

12. A process for bonding a first substrate to a second substrate, comprising the steps of:
   a) providing a curable composition as defined in claim 1;
   b) applying the curable composition to at least one part of the surface of the first substrate; and
   c) contacting said surface of the first substrate with a surface of a second substrate, to which the curable composition is optionally applied, under conditions of heat and pressure sufficient to create a cured bond between the two substrates.

13. A process for crosslinking an elastomeric material, comprising the steps of:
   a) providing a curable composition as defined in claim 1 in a non-cured form;
   b) mixing the composition with at least one elastomeric material to form a curable mixture; and
   c) exposing said curable mixture to conditions of heat and pressure sufficient to crosslink the elastomeric material.

14. The cured product of a curable composition according to claim 1.

15. A curable composition comprising reactive components that cure, the curable composition comprising:
   (i) at least one aromatic nitroso or at least one aromatic nitroso precursor compound or combinations thereof;
   (ii) a film former component comprising at least one non-halogenated hydroxy group-containing resin together with at least one crosslinking agent and
   (iii) a sulfur impregnated particulate solid which acts as a release agent for sulfur during the cure process.

16. The curable composition of claim 15 wherein the sulfur impregnated particulate solid is selected from the group consisting of: sulfur-impregnated clays, sulfur impregnated silicates, sulfur impregnated aluminates, sulfur impregnated charcoals, sulfur impregnated carbon blacks and combinations thereof.

17. The cured product of a curable composition according to claim 15.

* * * * *